US012557813B2

(12) United States Patent
Lerner Yardeni et al.

(10) Patent No.: US 12,557,813 B2
(45) Date of Patent: Feb. 24, 2026

(54) AGROCHEMICAL COMPOSITION OF TRIAZOLES

(71) Applicant: Adama Makhteshim Ltd., Beer Sheva (IL)

(72) Inventors: Jenny Lerner Yardeni, Mishmar Hanegev (IL); Alexander Tolts, Beer Sheva (IL); Michael Berkovitch, Ashdod (IL); Gilad Silbert, Kibutz Dorot (IL)

(73) Assignee: ADAMA MAKHTESHIM LTD., Beer Sheva (IL)

( * ) Notice: Subject to any disclaimer, the term of this patent is extended or adjusted under 35 U.S.C. 154(b) by 0 days.

(21) Appl. No.: 17/796,149

(22) PCT Filed: Jan. 28, 2021

(86) PCT No.: PCT/IB2021/050683

§ 371 (c)(1),
(2) Date: Jul. 28, 2022

(87) PCT Pub. No.: WO2021/152509

PCT Pub. Date: Aug. 5, 2021

(65) Prior Publication Data

US 2023/0073874 A1 Mar. 9, 2023

Related U.S. Application Data

(60) Provisional application No. 62/966,587, filed on Jan. 28, 2020.

(51) Int. Cl.
*A01N 43/653* (2006.01)
*A01P 3/00* (2006.01)

(52) U.S. Cl.
CPC .............. *A01N 43/653* (2013.01); *A01P 3/00* (2021.08)

(58) Field of Classification Search
CPC ................................ A01N 43/653; A01P 3/00
See application file for complete search history.

(56) References Cited

U.S. PATENT DOCUMENTS

| | | | |
|---|---|---|---|
| 5,326,789 A * | 7/1994 | Narayanan | |
| 5,328,693 A | 7/1994 | Horstmann et al. | |
| 5,369,118 A | 11/1994 | Reizlein et al. | |

FOREIGN PATENT DOCUMENTS

| | | | |
|---|---|---|---|
| EP | 1023837 B1 * | 3/2005 | |
| EP | 2913311 A1 | 9/2008 | |
| GB | 2269101 A | 2/1994 | |
| GB | 2269102 A | 2/1994 | |
| WO | WO 2010/057754 A1 | 5/2010 | |
| WO | WO 2010/149301 A2 | 12/2010 | |
| WO | WO 2013/189745 A2 | 12/2013 | |
| WO | WO 2015/135701 A1 | 9/2015 | |
| WO | WO 2017/097882 A1 | 6/2017 | |
| WO | WO 2017/211572 A1 | 12/2017 | |
| WO | 2018/178848 A1 * | 10/2018 | |

OTHER PUBLICATIONS

Office Action issued Aug. 24, 2023 in connection with U.S. Appl. No. 17/796,149, filed Jul. 28, 2022.

(Continued)

*Primary Examiner* — Alma Pipic
(74) *Attorney, Agent, or Firm* — Gary J. Gershik

(57) ABSTRACT

The invention relates to novel agrochemical compositions comprising: a) at least one triazole fungicide; b) carbonyl containing solvent; and c) N-alkyl pyrrolidone of formula (I) wherein R1 is a straight or branched, saturated or unsaturated, substituted or unsubstituted hydrocarbon group having from 5 to 10 carbon atoms. The invention also relates to the use of a combination of the abovementioned N-alkyl pyrrolidone of formula (I) with a carbonyl containing solvent for increasing the efficacy of one or more triazole fungicide. The invention further relates to an agrochemical composition comprising: a) at least one triazole fungicide; b) a carbonyl containing solvent; c) N-alkyl pyrrolidone of formula (I) and d) an effective amount of compound of formula (II) wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50. The invention relates to the use of a compound of formula (II) for increasing the efficacy of one or more triazole fungicide; and to a method of treating plants or plant parts with a combination of one or more triazole(s) fungicide with compound of formula wherein the compound of formula (II) is for increasing the efficacy of the one or more triazole(s).

(I)

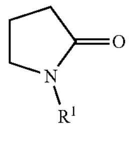

R2-Z-(CmH2mO)x-(CnH2nO)y-H(II)

14 Claims, 3 Drawing Sheets

(56) References Cited

OTHER PUBLICATIONS

Office Action issued Oct. 27, 2022 in connection with Moroccan Application No. 57424, filed on Jan. 28, 2021.
Jan. 31, 2023 Response to Oct. 27, 2022 Office Action issued in connection with Moroccan Application No. 57424.
Office Action issued Jun. 30, 2023 in connection with Chinese Application No. 202180020267.5, filed on Jan. 28, 2021.
Office Action issued Mar. 13, 2023 in connection with Israeli Application No. 294902, filed on Jan. 28, 2021.
Jun. 21, 2023 Response to Mar. 13, 2023 Office Action issued in connection with Israeli Application No. 294902.
Office Action issued Sep. 13, 2022 in connection with European Application No. 21703073.3, filed Jan. 28, 2021.
Mar. 22, 2023 Response to Sep. 13, 2022 Office Action issued in connection with European Application No. 21703073.3.
International Preliminary Report on Patentability issued Jul. 28, 2022 including Written Opinion of the International Searching Authority issued Jun. 8, 2021, in connection with PCT International Application No. PCT/IB2021/050683.
Jan. 28, 2025 First Office Action issued by the Israeli Patent and Trademark Office (ILPTO) in connection with Israeli Patent Application No. 294902.

* cited by examiner

AGROCHEMICAL COMPOSITION OF TRIAZOLES

CROSS-REFERENCE TO RELATED APPLICATIONS

This application is a § 371 national stage of PCT International Application NO. PCT/IB2021/050683, filed Jan. 28, 2021, claim ing the benefit of U.S. Provisional Application No. 62/966,587, filed Jan. 28, 2020, the entire contents of each of which are hereby incorporated by reference into the subject application.

Throughout this application various publications are referenced. The disclosures of these documents in their entireties are hereby incorporated by reference into this application in order to more fully describe the state of the art to which this invention pertains.

TECHNICAL FIELD OF THE INVENTION

The present invention relates to novel compositions of triazole fungicides for controlling plant diseases and a method for controlling plant diseases which possesses excellent control efficacy.

BACKGROUND OF THE INVENTION

Triazoles are an important class of active ingredients in the pesticide field as they inhibit C14-demethylase enzymes which play an essential role in sterol production. Sterols, such as ergosterol, are needed for fungal membrane structure and function, making them critical for the development of functional cell walls. Triazoles cause an abnormal fungal growth that results in death and therefore, are widely used for the treatment of fungal infections.

Triazole fungicides are economically important agricultural chemicals as they are widely used on crops such as wheat, barley, soybean and orchard fruits and have protective, curative and eradicant properties.

One such fungicidal triazole is 2-[2-(1-chlorocyclopropyl)-3-(2-chloro-phenyl)-2-hydroxy-propyl]-2,4-dihydro-3H-1,2,4-triazole-3-thione, also known as prothioconazole (WO 1996/16048).

*Fusarium* head blight is a very important disease of small grain cereals with *F culmorum* and *F. graminearum* as some of the most important causal agents. These species can attack wheat and other cereals over a broad range of environments and temperatures. These pathogens not only cause reduction in yield and quality but also reduces the quality of the grain by contamination with mycotoxins such as deoxynivalenol (DON) which can accumulate to toxic levels for humans and animals.

The efficacy of agrochemicals as crop protection agents is generally a function of the intrinsic properties of the active ingredients, such as their toxicity, plant movement, penetration capacity, and mechanism of action. However, it is also influenced by the formulation and the mode of application of the commercial product which includes solvents and/or solvent mixtures, surfactants and adjuvants among other parameters. Different formulations of the same active ingredient may have different efficacies. This is a result of formulation aids which can alter biological activity of the pesticide by, for example, changing the stability, solubility, crystallization, photochemical degradation, duration of delivery of the active ingredient etc.

Based on all the above there is a need to provide stable and safe novel compositions of triazole fungicides for controlling plant diseases and a method for controlling plant diseases which possesses excellent control efficacy.

The invention provides novel, improved triazole containing compositions which have high storage stability and exhibit high efficacy as fungicidal agents.

It has surprisingly been found that the compositions of the present invention exhibit high efficacy in reducing mycotoxins levels such as deoxynivalenol (DON).

SUMMARY OF THE INVENTION

The present invention therefore provides an agrochemical composition comprising:

a) at least one triazole fungicide;

b) a carbonyl containing solvent; and c) N-alkyl pyrrolidone of formula (I):

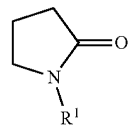

wherein R1 is a straight or branched, saturated or unsaturated, substituted or unsubstituted hydrocarbon group having from 5 to 10 carbon atoms.

In other embodiments, the present invention is directed to the use of a combination of a carbonyl containing solvent with N-alkyl pyrrolidone of formula (I), wherein R1 is a straight or branched, saturated or unsaturated, substituted or unsubstituted hydrocarbon group having from 5 to 10 carbon atoms for increasing the efficacy of one or more triazole fungicide.

In yet other embodiments the present invention is directed to an agrochemical composition comprising:

a) at least one triazole fungicide;

b) a carbonyl containing solvent;

c) N-alkyl pyrrolidone of formula (I):

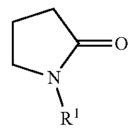

wherein R1 is a straight or branched, saturated or unsaturated, substituted or unsubstituted hydrocarbon group having from 5 to 10 carbon atoms; and d) an effective amount of compound of formula (II):

R2-Z—(CmH2*m*O)*x*-(CnH2*n*O)*y*—H wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50.

In other embodiments the present invention also provides the use of a compound of formula (II):

R2-Z—(CmH2*m*O)*x*-(CnH2*n*O)*y*—H wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50, for increasing the efficacy of one or more triazole fungicide.

In some embodiments the present invention provides a method of treating plants or plant parts with a combination of one or more triazole fungicide with compound of formula (II):

R2-Z—(CmH2*m*O)*x*-(CnH2*n*O)*y*—H wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, n is an integer of from 2 to 3, x is an integer of from 3 to 50 and y is an integer of from 0 to 50.

wherein the compound of formula (II) is for increasing the efficacy of the one or more triazole(s).

DETAILED DESCRIPTION OF THE PREFERRED EMBODIMENTS

Definitions

Figure 1:
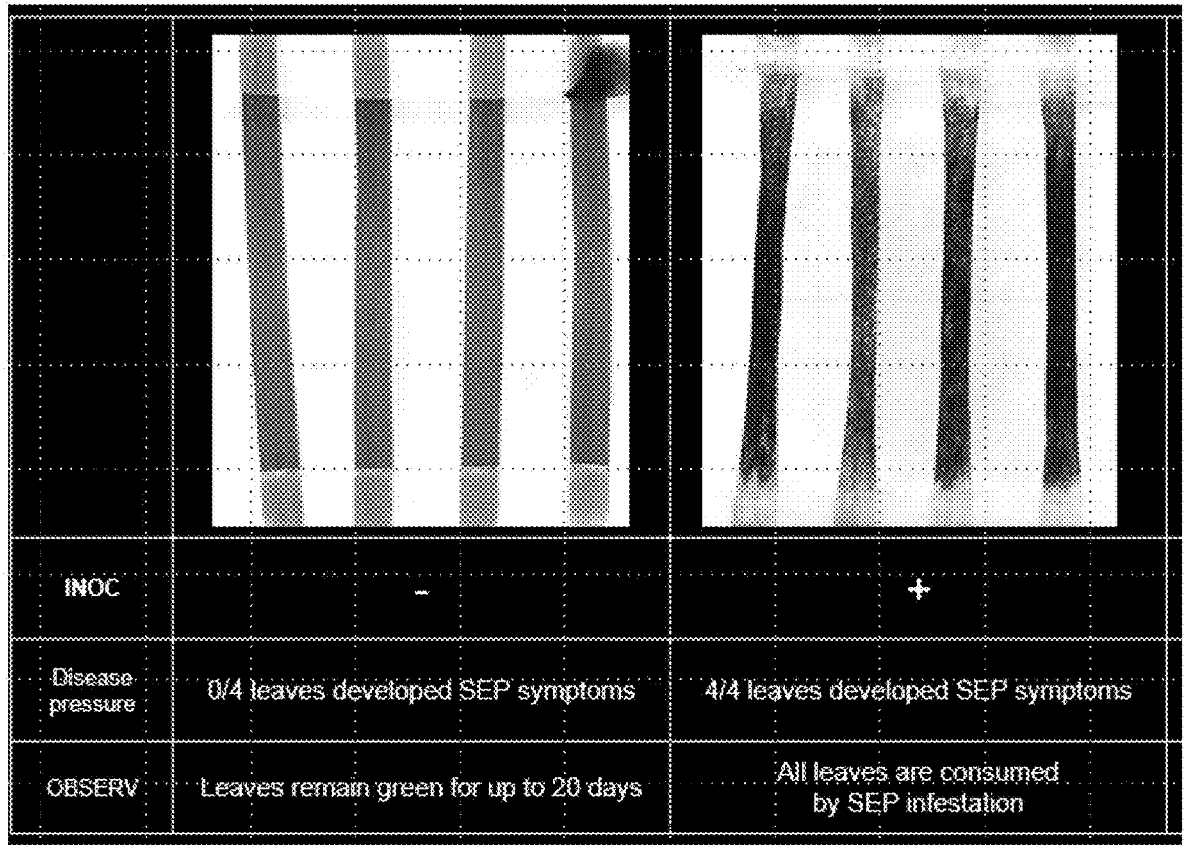
FIG. 1 shows leaves not inoculated vs. inoculated, UTC.

Prior to setting forth the present subject matter in detail, it may be helpful to provide definitions of certain terms to be used herein. Unless defined otherwise, all technical and scientific terms used herein have the same meaning as is commonly understood by one of skill in the art to which this subject matter pertains. The following definitions are provided for clarity.

The term "a" or "an" as used herein includes the singular and the plural, unless specifically stated otherwise. Therefore, the terms "a," "an," or "at least one" can be used interchangeably in this application.

As used herein, the verb "comprise" as is used in this description and in the claims and its conjugations are used in its non-limiting sense to mean that items following the word are included, but items not specifically mentioned are not excluded.

As used herein, the term "about" when used in connection with a numerical value includes ±10% from the indicated value. In addition, all ranges directed to the same component or property herein are inclusive of the endpoints, are independently combinable, and include all intermediate points and ranges. It is understood that where a parameter range is provided, all integers within that range, and tenths thereof, are also provided by the invention.

As used herein, the term "effective amount" refers to an amount of the active component that is commercially recommended for use to control and/or prevent pest. The commercially recommended amount for each active component, often specified as application rates of the commercial formulation, may be found on the label accompanying the commercial formulation. The commercially recommended application rates of the commercial formulation may vary depending on factors such as the plant species and the pest to be controlled.

As used herein, the term "pest" includes, but is not limited to, unwanted phytopathogenic harmful fungi, unwanted insect, unwanted nematode, and weed.

As used herein, the term "pesticide" broadly refers to an agent that can be used to prevent, control and/or kill a pest. The term is understood to include but is not limited to fungicides, insecticides, nematicides, herbicides, acaricides, parasiticides or other control agents. For chemical classes and applications, as well as specific compounds of each class, see "The Pesticide Manual Thirteenth Edition" (British Crop Protection Council, Hampshire, U K, 2003), as well as "The e-Pesticide Manual, Version 3" (British Crop Protection Council, Hampshire, U K, 2003-04), the contents of each of which are incorporated herein by reference in their entirety.

As used herein, the term "locus" includes not only areas where the pest may already be developed, but also areas where pests have yet to emerge, and also to areas under cultivation. Locus includes the plant or crop and propagation material of the plant or crop. Locus also includes the area surrounding the plant or crop and the growing media of the plant or crop, such as soil and crop field.

As used herein the term "plant" or "crop" includes reference to whole plants, plant organs (e.g. leaves, stems, twigs, roots, trunks, limbs, shoots, fruits etc.), plant cells, or plant seeds.

This term also encompasses plant crops such as fruits, spores, corms, bulbs, rhizomes, sprouts basal shoots, stolons, and buds and other parts of plants, including seedlings and young plants, which are to be transplanted after germination or after emergence from soil.

As used herein the term "ha" refers to hectare.

The present invention provides an agrochemical composition comprising:

a) at least one triazole fungicide;

b) a carbonyl containing solvent; and c) N-alkyl pyrrolidone of formula (I):

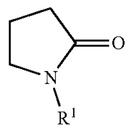

wherein R1 is a straight or branched, saturated or unsaturated, substituted or unsubstituted hydrocarbon group having from 4 to 10 carbon atoms;

In some embodiments, the at least one triazole fungicide is selected from azaconazole, bitertanol, bromuconazole, cyproconazole, diclobutrazol, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, paclobutrazol, penconazole, quinconazole, simeconazole, tetraconazole, triadimenol, triadimefon, triticonazole, uniconazole, uniconazole-P, voriconazole, prothioconazole, difenoconazole, propiconazole, tebuconazole, mefentrifluconazole and any mixture thereof. In some embodiments, the triazole fungicide is prothioconazole, tebuconazole and any mixture thereof. In some embodiments, the triazole fungicide is tebuconazole. In some embodiments, the triazole fungicide is prothioconazole.

In some embodiments, the compositions of the present invention comprise a carbonyl containing solvent which is selected from the groups of ketones, amides, ureas, esters, lactones, carbonates and any mixtures thereof.

In some embodiments, the ketone solvent is selected from acetone, diacetone alcohol, methyl ethyl ketone, 2-pentanone, 3-pentanone, 2-hexanone, 3-hexanone, 2-heptanone, 3-heptanone, 4-heptanone, 2-octanone, 3-octanone, 4-octanone, methyl isopropyl ketone, methyl isobutyl ketone, methyl isopentyl ketone, ethyl isopropyl ketone, ethyl isobutyl ketone, ethyl isopentyl ketone, propyl isopropyl ketone, propyl isobutyl ketone, propyl isopentyl ketone, 3,3-dimethyl-2-butanone, 2,4-dimethyl-3-pentanone, 4,4-dimethyl-2-pentanone, 2,6-dimethyl-4-heptanone, 2,2,4,4-tetramethyl-3-pentanone, cyclopentanone, cyclohexanone, cycloheptanone, cyclooctenone (30), 2,4,6-cycloheptatrien-1-one, acetophenone, propiophenone (19), 1-(4-methylphenyl)ethanone, 1-(4-ethylphenyl)ethanone, 2-methyl-1-phenyl-1-propanone, 1-(3-ethylphenyl)ethanone, 4-phenyl-2-butanone, 1-phenyl-2-propanone, 1-phenyl-2-butanone, 2-phenyl-3-butanone, butyrophenone, valerophenone and any mixtures thereof. In a preferred embodiment the ketone is cyclohexanone, acetophenone, heptanone and any mixtures thereof. In a more preferred embodiment, the ketone is acetophenone.

In some embodiments, the amide solvent is selected from N-formylmorpholine, N,N-dimethylformamide, N,N-dimethylacetamide, N,N-imethylbenzamide, N,N-dimethyloctanamide, N,N-dimethyldecanamide, N,N-dimethyldec-9-en-1-amide, N,N-dimethyldodedecanamide, N,N-dimethyllactamide, N,N-decylmethylformamide, N-methyl-2-pyrrolidone, N-ethyl-2-pyrrolidone, N-propyl-2-pyrrolidone, N-butyl pyrrolidone, N-pentyl-2-pyrrolidone, N-hexyl-2-pyrrolidone, N-heptyl-2-pyrrolidone, N-octyl-2-pyrrolidone, N-nonyl-2-pyrrolidone, N-decyl-2-pyrrolidone, N-undecenyl-2-pyrrolidone, N-dodecyl-2-pyrrolidone, N-methyl-2-piperidone, N-methylcaprolactam, N-octylcaprolactam, 1,3-dimethyl-2-imidazolidinone, 1,3,4-trimethyl-2-imidazolidinone, 1,3-dimethyl-3,4,5,6-tetrahydro-2(1H)pyrimidinone 1-heptyl-3-methyl-2-imidazolidinone, 1-heptyl-1,3-dihydro-3-methyl-2H-imidazol2-one and any mixture thereof. In a preferred embodiment the amide is N,N-dimethyldecanamide, N,N-dimethyldecenamide, N,N-dimethyl-octanamide and any mixtures thereof.

In some embodiments, the urea solvent is selected from tetramethylurea, tetraethylurea and any mixture thereof.

In some embodiments, the lactone solvent is selected from butyrolactone, alpha-methyl-gamma-butyrolactone, gamma-valerolactone, delta-valerolactone and any mixture thereof.

In some embodiments, the carbonate solvent is selected from dimethyl carbonate, methyl ethyl carbonate, diethyl carbonate, dipropyl carbonate, diisopropyl carbonate, dibutyl carbonate, dipentyl carbonate, dihexyl carbonate, diheptyl carbonate, dioctyl carbonate, dinonyl carbonate, didecyl carbonate, ethylene carbonate, 4-methyl-1,3-dioxolan-2-one, 4-(methoxymethyl)-1,3-dioxolan-2-one, glycerol carbonate, butylene carbonate, 4,6-dimethyl-3-dioxan-2-one, dibenzyl carbonate and any mixture thereof.

In some embodiments, the compositions of the present invention comprise, N-alkyl pyrrolidone of formula (I), wherein R1 is a hydrocarbon group having from 7 to 9 carbon atoms. In a preferred embodiment R1 is a hydrocarbon group having 8 carbon atoms.

In a preferred embodiment, the carbonyl containing solvent is acetophenone and the N-alkyl pyrrolidone is N-octyl pyrrolidone.

In a preferred embodiment, the carbonyl containing solvent is acetophenone and the N-alkyl pyrrolidone is N-octyl pyrrolidone wherein the ratio between the acetophenone and the N-octyl pyrrolidone is of about 2:1.

In a preferred embodiment, the triazole is prothioconazole, the carbonyl containing solvent is acetophenone and the N-alkyl pyrrolidone is N-octyl pyrrolidone.

In some embodiments, the ratio between the carbonyl containing solvent and the N-alkyl pyrrolidone of formula (I) is of about 0.5:1 to about 3:1. In a more preferred embodiment, the ratio between the carbonyl containing solvent and the N-alkyl pyrrolidone of formula (I) is of about 1:1 to about 2:1.

In a preferred embodiment, the triazole is prothioconazole, the carbonyl containing solvent is acetophenone and the N-alkyl pyrrolidone is N-octyl pyrrolidone wherein the ratio between acetophenone and N-octyl pyrrolidone is of about 2:1.

In some embodiments, the amount of triazole fungicide in the compositions of the present invention is about 0.1% to about 50% by weight, based on the total weight of the composition. In a preferred embodiment, the amount of triazole fungicide in the composition is about 10% to about 30% by weight, based on the total weight of the composition. In a more preferred embodiment, the amount of triazole fungicide in the composition is about 20% to about 25% by weight, based on the total weight of the composition. In a specially preferred embodiment, the amount of triazole fungicide in the composition is of about 25% weight, based on the total weight of the composition.

In a preferred embodiment, the triazole is prothioconazole, the carbonyl containing solvent is acetophenone and the N-alkyl pyrrolidone is N-octyl pyrrolidone. In a specific embodiment, the ratio between acetophenone and the N-octyl pyrrolidone is of about 2:1. In another specific embodiment, prothioconazole is in an amount of about 25% weight, based on the total weight of the composition.

The present invention also provides a method for controlling and/or preventing pests comprising applying an effective amount of the composition to a locus where the pest is to be controlled and/or prevented so as to thereby control and/or prevent the pest.

In some embodiments, the pest to be controlled and/or prevented is selected for example from phytopathogenic harmful fungi, insects, arachnids, nematodes and weeds. In a preferred embodiment, the pest to be controlled and/or prevented is a phytopathogenic harmful fungi.

The present invention also provides a method for controlling and/or preventing phytopathogenic harmful fungi comprising applying an effective amount of the compositions of the present invention to a locus where the phytopathogenic harmful fungi is to be controlled so as to thereby control the phytopathogenic harmful fungi.

In some embodiments, the locus where the phytopathogenic harmful fungi to be controlled is a crop field.

The present invention also provides a method of controlling phytopathogenic harmful fund in a field of crop comprising applying an effective amount of the compositions disclosed herein to a field of crop so as to thereby control the phytopathogenic harmful fungi in the field of crop.

In some embodiments, the crop is selected from the group consisting of cotton, flax, grapevines, fruit, vegetables, such as *Rosaceae* sp. (for example pome fruit such as apples and pears, but also stone fruit such as apricots, cherries, almonds and peaches, and berry fruits such as strawberries), Ribesioidae sp., Juglandaceae sp., Betulaceae sp., Anacardiaceae sp., *Fagaceae* sp., *Moraceae* sp., *Oleaceae* sp., Actinidaceae sp., *Lauraceae* sp., Musaceae sp. (for example banana trees and plantations), Rubiaceae sp. (for example coffee), Theaceae sp., Sterculiceae sp., *Rutaceae* sp. (for example lemons, organs and grapefruit); Solanaceae sp. (for example tomatoes), *Liliaceae* sp., Asteraceae sp. (for example lettuce), *Umbelliferae* sp., *Cruciferae* sp., Chenopodiaceae sp., Cucurbitaceae sp. (for example cucumbers), Alliaceae sp. (for example leeks, onions), Papilionaceae sp. (for example peas); main crop plants such as *Gramineae* sp. (for example maize, turfgrass, cereals such as wheat, rye, rice, barley, oats, sorghum/millet and triticale), Asteraceae sp. (for example sunflowers), Brassicaceae sp. (for example white cabbage, red cabbage, broccoli, cauliflower, Brussels sprouts, Pak Choi, kohlrabi, radishes, and rapeseed, mustard, horseradish and cress), Fabacae sp. (for example beans, peanuts), Papilionaceae sp. (for example soya beans), Solanaceae sp. (for example potatoes), Chenopodiaceae sp. (for example sugar beet, fodder beet, chard, beetroot); sugarcane, poppies, olives, coconuts, cocoa, tobacco and useful plants and ornamental plants in gardens and forests; and genetically modified varieties of each of these plants, and the seeds of these plants. In a preferred embodiment, the crop is selected from the group consisting of wheat, rye, rice, barley, oats, sorghum/millet, triticale, maize, rapeseed, beans, peanuts and sunflowers. In a more preferred embodiment, the crop is selected from the group consisting of wheat, rye, rice, barley, oats, sorghum/millet and triticale.

Non-limiting examples of pathogens of fungal diseases which may be treated in accordance with the invention include: diseases caused by powdery mildew pathogens, for example *Blumeria* species, for example *Blumeria graminis, Podosphaera* species, for example *Podosphaera leucotricha, Sphaerotheca* species, for example *Sphaerotheca fuliginea, Uncinula* species, for example *Uncinula necator*, for example *Erysiphe* species; diseases caused by rust disease pathogens, for example Gynmosporangium species, for example *Gymnosporangium sabinae; Hemileia* species, for example *Hemileia vastatrix; Phakopsora* species, for example *Phakopsora pachyrhizi* or *Phakopsora meibomiae Puccinia* species, for example *Puccinia recondita, Puccinia graminis* oder *Puccinia* striif ormis. *Uromyces* species, for example *Uromyces* app endiculatus, diseases caused by pathogens from the group of the Oomycetes, for example *Albugo* species, for example *Albugo Candida, Bremia* species, for example *Bremia* laciucaer, *Peronospora* species, for example *Peronospora pili* or P. brassicaer, *Phytophthora* species, for example *Phytophthora infestans, Plasmopara* species, for example *Plasmopara viticola, Pseudoperonospora* species, for example *Pseudoperonospora humuli* or *Pseudoperonospora cubensis, Pythium* species, for example *Pythium* ultimunv, leaf blotch diseases and leaf wilt diseases caused, for example, by *Alternaria* species, for example *Alternaria* solanv, *Cercospora* species, for example *Cercospora beticola*, Cladiosporium species, for example Cladiosporium cucumerinunr, *Cochliobolus* species, for example *Cochliobolus sativus* (conidial form: *Drechslera*, syn: *Helminthosporium*) or *Cochliobolus miyabeanus, Colletotrichum* species, for example *Colletotrichum* lindemuthaniunv, *Corynespora* species, for example *Corynespora cassiicola, Cycloconium* species, for example *Cycloconium* oleaginunv, *Diaporthe* species, for example *Diaporthe* citrv, *Elsinoe* species, for example *Elsinoe fawcettii, Gloeosporium* species, for example *Gloeosporium laeticolor, Glomerella* species, for example *Glomerella cingulata, Guignardia* species, for example *Guignardia* bidwellv, *Leptosphaeria* species, for example *Leptosphaeria maculans, Magnaporthe* species, for example *Magnaporthe grisea, Microdochium* species, for example *Microdochium* nivaler, *Mycosphaerella* species, for example *Mycosphaerella graminicola* (also known as *Septoria tritici*), *Mycosphaerella arachidicola* or *Mycosphaerella* fijiens, *Phaeosphaeria* species, for example *Phaeosphaeria* nodorunr, *Pyrenophora* species, for example *Pyrenophora teres* or *Pyrenophora tritici* rep enth, *Ramularia* species, for example *Ramularia collo-cygni* or *Ramularia areola, Rhynchosporium* species, for example *Rhynchosporium secalis, Septoria* species, for example *Septoria apii* or *Septoria* lycopersicv, *Stagonospora* species, for example *Stagonospora* nodorunr, *Typhula* species, for example *Typhula incarnata, Venturia* species, for example *Venturia* inaequal, root and stem diseases caused, for example, by *Corticium* species, for example *Corticium graminearum, Fusarium* species, for example *Fusarium oxysporum\Gaeumannomyces* species, for example *Gaeumannomyces graminis, Plasmodiophora* species, for example *Plasmodiophora brassica, Rhizoctonia* species, for example *Rhizoctonia solani, Sarocladium* species, for example *Sarocladium oryzae; Sclerotium* species, for example *Sclerotium oryzae, Tapesia* species, for example *Tapesia acuformis, Thielaviopsis* species, for example *Thielaviopsis basicola*, ear and panicle diseases (including corn cobs) caused, for example, by *Alternaria* species, for example *Alternaria* spp.; *Aspergillus* species, for example *Aspergillus flavus, Cladosporium* species, for example *Cladosporium cladosporioides, Claviceps* species, for example *Claviceps purpurea, Fusarium* species, for example *Fusarium* culmorunr, *Gibberella* species, for example *Gibberella zeae Monographella* species, for example *Monographella nivalis*, Stagnospora species, for example Stagnospora nodorunr, diseases caused by smut fungi, for example *Sphacelotheca* species, for example *Sphacelotheca reiliana, Tilletia* species, for example *Tilletia caries* or *Tilletia* controversy, *Urocystis* species, for example *Urocystis occulta, Ustilago* species, for example *Ustilago nuda*, fruit rot caused, for example, by *Aspergillus* species, for example *Aspergillus flavus, Botrytis* species, for example *Botrytis cinerea, Monilinia* species, for example *Monilinia* Ιαχα, *Penicillium* species, for example *Penicillium expansum* or *Penicillium purpurogenum, Rhizopus* species, for example *Rhizopus stolonifer, Sclerotinia* species, for example *Sclerotinia sclerotiorum*, Verticilium species, for example Verticilium *alboatrum*, seed- and soil-bome rot and wilt diseases, and also diseases of seedlings, caused; for example, by *Alternaria* species, for example *Alternaria* brasside ola *Aphanomyces* species, for example *Aphanomyces euteiches, Ascochyta* species, for example *Ascochyta* lends, *Aspergillus* species, or example *Aspergillus flavus, Cladosporium* species, for example *Cladosporium herbarum, Cochliobolus* species, for example *Cochliobolus sativus* (conidial form: *Drechslera, Bipolaris* Syn: *Helminthosporium*), *Colletotrichum* species, for example *Colletotrichum coccodes, Fusarium* species, for example *Fusarium culmorum, Gibberella* species, for example *Gibberella zeae Macrophomina* species; for example *Macrophomina phaseolina, Microdochium* species, for example *Microdochium nivale, Monographella* species, for example *Monographella nivalis, Penicillium* species, for example *Penicillium expansum, Phoma* species, for example *Phoma lingam, Phomopsis* species, for example *Phomopsis* so ae *Phytophthora* species, for example *Phytophthora cactorum, Pyrenophora* species, for example *Pyrenophora graminea, Pyricularia* species, for example *Pyricularia* oryzac, *Pythium* species, for example *Pythium ultimum, Rhizoctonia* species, for example *Rhizoctonia* solanv, *Rhizopus* species, for example *Rhizopus ory-* zae; *Sclerotium* species, for example *Sclerotium rolfsii, Septoria* species, for example *Septoria nodorum, Typhula* species, for example *Typhula* incamata; *Verticillium* species, for example *Verticillium dahliae*, cancers, galls and witches' broom caused, for example, by *Nectria* species, for example *Nectria galligena*, wilt diseases caused, for example, by *Verticillium* species, for example *Verticillium* longisporunr, *Fusarium* species, for example *Fusarium* oxysporurrv, deformations of leaves, flowers and fruits caused, for example, by *Exobasidium* species, for example *Exobasidium vexans, Taphrina* species, for example *Taphrina deformans*, degenerative diseases in woody plants, caused, for example, by Esca species, for example *Phaeomoniella chlamydospora, Phaeoacremonium aleophilum* or Fomitiporia-mediterranean *Ganoderma* species, for example *Ganoderma boninense*, diseases of plant tubers caused, for example, by *Rhizoctonia* species, for example *Rhizoctonia* solanv, *Helminthosporium* species, for example *Helminthosporium* solanv, diseases caused by bacterial pathogens, for example *Xanthomonas* species, for example *Xanthomonas campestris* pv. *oryzae, Pseudomonas* species, for example *Pseudomonas syringae* pv. *lachrymans, Erwinia* species, for example *Erwinia amylovora*, Liberibacter species, for example Liberibacter *asiaticus*, Xyella species, for example *Xylella fastidiosa, Ralstonia* species, for example *Ralstonia solanacearum, Dickeya* species, for example *Dickeya* solanv, *Clavibacter* species, for example *Clavibacter michiganensis, Streptomyces* species, for example *Streptomyces scabies*, diseases of soya beans: fungal diseases on leaves, stems, pods and seeds caused, for example, by *Alternaria* leaf spot (*Alternaria* spec *atrans tenuissima*), Anthracnose (*Colletotrichum* gloeosporoides *dematium* var. *truncatum*), brown spot (*Septoria glycines*), *cercospora* leaf spot and blight (*Cercospora kikuchii*), *choanephora* leaf blight (*Choanephora infundibulifera trispora* (Syn.j), *dactuliophora* leaf spot (*Dactuliophora glycines*), downy mildew (*Peronospora manshurica*), *drechslera* blight (*Drechslera* glycini), frogeye leaf spot (*Cercospora sojina*), *leptosphaerulina* leaf spot (*Leptosphaerulina trifolii*), phyllostica leaf spot (*Phyllosticta* sojaecola), pod and stem blight (*Phomopsis sojae*), powdery mildew (*Microsphaera diffusa*), *pyrenochaeta* leaf spot (*Pyrenochaeta glycines*), *rhizoctonia* aerial, foliage, and web blight (*Rhizoctonia solani*), mst (*Phakopsora pachyrhizi, Phakopsora meibomiae*), scab (*Sphaceloma glycines*), *stemphylium* leaf blight (*Stemphylium botryosum*), sudden death syndrome (*Fusarium virguliforme*), target spot (*Corynespora cassiicola*). Fungal diseases on roots and the stem base caused, for example, by black root rot (*Calonectria crotalariae*), charcoal rot (*Macrophomina phaseolina*), *fusarium* blight or wilt, root rot, and pod and collar rot (*Fusarium oxysporum, Fusarium orthoceras, Fusarium semitectum, Fusarium equiseti*), *mycoleptodiscus* root rot (*Mycoleptodiscus terrestris*), *neocosmospora* (*Neocosmospora vasinfecta*), pod and stem blight (*Diaporthe phaseolorum*), stem canker (*Diaporthe phaseolorum* var. *caulivora*), *phytophthora* rot (*Phytophthora megasperma*), brown stem rot (*Phialophora gregata*), pythiumrot (*Pythium aphanidermatum, Pythium irregulare, Pythium debaryanum, Pythium myriotylum, Pythium ultimum*), *rhizoctonia* root rot, stem decay, and damping-off (*Rhizoctonia solani*), *sclerotinia* stem decay (*Sclerotinia sclerotiorum*), *sclerotinia* southern blight (*Sclerotinia rolfsii*), *thielaviopsis* root rot (*Thielaviopsis basicola*).

In some embodiments, the phytopathogenic harmful fungi is selected from *Septoria* species, *Fusarium* species, *Puccinia* species, Erisyphe species, *Drechslera* species, *Ramularia* species, *Mycosphaerella* species and Rhynchasporium species.

In some embodiments, the phytopathogenic harmful fungi is selected from *Puccinia recondita, Septoria tritici, Fusarium culmorum, Pyrenophora teres* and *Rhynchosporium secalis.*

In some embodiments, the composition is applied in an amount from about 0.1 L/ha to about 2 L/ha. In some embodiments, the composition is applied in an amount from about 0.4 L/ha to about 1 L/ha.

In some embodiments, the composition is applied in an amount from about 20 g/ha of triazole to about 500 g/ha of triazole. In some embodiments, the composition is applied in an amount from about 100 g/ha of triazole to about 250 g/ha of triazole.

In some embodiments, the triazole fungicide applied in the method disclosed herein is prothioconazole, tebuconazole and any mixture thereof. In some embodiments, the triazole fungicide applied in the method disclosed herein is prothioconazole. In some embodiments, the triazole fungicide applied in the method disclosed herein is tebuconazole.

The present invention also provides use of the composition disclosed herein for controlling and/or preventing pests.

In some embodiments, the pest is phytopathogenic harmful fungi.

The present invention also provides a method for reducing deoxynivalenol (DON) mycotoxin in a field of crop comprising applying an effective amount of the composition comprising:

a) at least one triazole fungicide;

b) a carbonyl containing solvent; and c) N-alkyl pyrrolidone of formula (I):

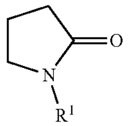

wherein R1 is a straight or branched, saturated or unsaturated, substituted or unsubstituted hydrocarbon group having from 4 to 10 carbon atoms; to a crop infected by fungi of the *Fusarium* species.

In some embodiments, the crop is selected from the group consisting of wheat, rye, rice, barley, oats, sorghum/millet, triticale, maize, rapeseed, beans, peanuts and sunflowers.

In some embodiments, the crop is wheat.

In some embodiments, the *Fusarium* specie is *Fusarium culmorum.*

In a preferred embodiment, the method for reducing deoxynivalenol (DON) mycotoxin in a field of crop comprises applying an effective amount of the composition wherein, the triazole fungicide is prothioconazole, the carbonyl containing solvent is acetophenone and the N-alkyl pyrrolidone is N-octyl pyrrolidone. In a specific embodiment, the amount of prothioconazole is about 20% to about 25% by weight, based on the total weight of the composition. In another specific embodiment, the ratio between acetophenone and the N-octyl pyrrolidone is of 2:1. In a more specific embodiment, the *Fusarium* specie is *Fusarium culmorum* and the crop is wheat.

The present invention also provides use of the compositions disclosed herein for reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers. In some embodiments, the crop is wheat.

The present invention also provides the compositions comprising:

a) at least one triazole fungicide;

b) a carbonyl containing solvent; and c) N-alkyl pyrrolidone of formula (I):

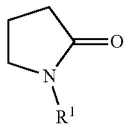

wherein R1 is a straight or branched, saturated or unsaturated, substituted or unsubstituted hydrocarbon group having from 4 to 10 carbon atoms; for use in reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers. In some embodiments, the crop is wheat.

In a preferred embodiment, the use for reducing deoxynivalenol (DON) mycotoxin in crop infected by fungi of the *Fusarium* species comprises applying an effective amount of the composition wherein, the triazole fungicide is prothioconazole, the carbonyl containing solvent is acetophenone and the N-alkyl pyrrolidone is N-octyl pyrrolidone. In a specific embodiment, the amount of prothioconazole is about 20% to about 25% by weight, based on the total weight of the composition. In another specific embodiment, the ratio between acetophenone and the N-octyl pyrrolidone is of 2:1. In a more specific embodiment, the *Fusarium* specie is *Fusarium culmorum* and the crop is wheat.

In a different aspect, the invention relates to the use of a combination of a of carbonyl containing solvent with N-alkyl pyrrolidone of formula (I)

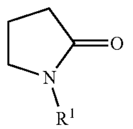

wherein R1 is a straight or branched, saturated or unsaturated, substituted or unsubstituted hydrocarbon group having from 4 to 10 carbon atoms for increasing the efficacy of one or more triazole fungicide.

In some embodiments, the triazole fungicide is selected from azaconazole, bitertanol, bromuconazole, cyproconazole, diclobutrazol, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, paclobutrazol, penconazole, quinconazole, simeconazole, tetraconazole, triadimenol, triadimefon, triticonazole, uniconazole, uniconazole-P, voriconazole, prothioconazole, difenoconazole, propiconazole, tebuconazole, mefentrifluconazole and any mixture thereof. In a preferred embodiment, the triazole fungicide is prothioconazole, tebuconazole and any mixture thereof. In a more preferred embodiment, the triazole fungicide is prothioconazole.

In some embodiments, the combinations of the present invention comprise a carbonyl containing solvent which is selected from the groups of ketones, amides, ureas, esters, lactones, carbonates and any mixtures thereof.

In some embodiments, the ketone solvent is selected from acetone, diacetone alcohol, methyl ethyl ketone, 2-pentanone, 3-pentanone, 2-hexanone, 3-hexanone, 2-heptanone, 3-heptanone, 4-heptanone, 2-octanone, 3-octanone, 4-octanone, methyl isopropyl ketone, methyl isobutyl ketone, methyl isopentyl ketone, ethyl isopropyl ketone, ethyl isobutyl ketone, ethyl isopentyl ketone, propyl isopropyl ketone, propyl isobutyl ketone, propyl isopentyl ketone, 3,3-dimethyl-2-butanone, 2,4-dimethyl-3-pentanone, 4,4-dimethyl-2-pentanone, 2,6-dimethyl-4-heptanone, 2,2,4,4-tetramethyl-3-pentanone, cyclopentanone, cyclohexanone, cycloheptanone, cyclooctanone, 2,4,6-cycloheptatrien-1-one, acetophenone, propiophenone, 1-(4-methylphenyl) ethanone, 1-(4-ethylphenyl)ethanone, 2-methyl-1-phenyl-1-propanone, 1-(3-ethylphenyl)ethanone, 4-phenyl-2-butanone, 1-phenyl-2-propanone, 1-phenyl-2-butanone, 2-phenyl-3-butanone, butyrophenone, valerophenone and any mixtures thereof. In a preferred embodiment the ketone is cyclohexanone, acetophenone, heptanone and any mixtures thereof. In a more preferred embodiment, the ketone is acetophenone.

In some embodiments, the amide solvent is selected from N-formylmorpholine, N,N-dimethylformamide, N,N-dimethylacetamide, N,N-imethylbenzamide, N,N-dimethyloctanamide, N,N-dimethyldecanamide, N,N-dimethyldec-9-en-1-amide, N,N-dimethyldodedecanamide, N,N-dimethyllactamide, N,N-decylmethylformamide, N-methyl-2-pyrrolidone, N-ethyl-2-pyrrolidone, N-propyl-2-pyrrolidone, N-butyl pyrrolidone, N-pentyl-2-pyrrolidone, N-hexyl-2-pyrrolidone, N-heptyl-2-pyrrolidone, N-octyl-2-pyrrolidone, N-nonyl-2-pyrrolidone, N-decyl-2-pyrrolidone, N-undecenyl pyrrolidone, N-dodecyl-2-pyrrolidone, N-methyl-2-piperidone, N-methylcaprolactam, N-octyl-caprolactam, 1,3-dimethyl-2-imidazolidinone, 1,3,4-trimethyl-2-imidazo dinone, 1,3-dimethyl-3,4,5,6-tetrahydro-2 (1H)pyrimidinone, 1-heptyl-3-methyl-2-imidazolidinone, 1-heptyl-1,3-dihydro-3-methyl-2H-imidazol2-one and any mixture thereof. In a preferred embodiment the amide is N,N-dimethyldecanamide, N,N-dimethyldecenamide, N,N-dimethyl-octanamide and any mixtures thereof.

In some embodiments, the urea solvent is selected from tetramethylurea, tetraethylurea and any mixture thereof.

In some embodiments, the lactone solvent is selected from butyrolactone, alpha-methyl-gamma-butyrolactone, gamma-valerolactone, delta-valerolactone and any mixture thereof.

In some embodiments, the carbonate solvent is selected from dimethyl carbonate, methyl ethyl carbonate, diethyl carbonate, dipropyl carbonate, diisopropyl carbonate, dibutyl carbonate, dipentyl carbonate, dihexyl carbonate, diheptyl carbonate, dioctyl carbonate, dinonyl carbonate, didecyl carbonate, ethylene carbonate, 4-methyl-1,3-dioxolan-2-one, 4-(methoxymethyl)-1,3-dioxolan-2-one, glycerol carbonate, butylene carbonate, 4,6-dimethyl-3-dioxan-2-one, dibenzyl carbonate and any mixture thereof.

In some embodiments, R1 in the N-alkyl pyrrolidone of formula (I) is a hydrocarbon group having from 7 to 9 carbon atoms. In a preferred embodiment, R1 is a hydrocarbon group having 8 carbon atoms.

In a preferred embodiment, the carbonyl containing solvent is acetophenone and the N-alkyl pyrrolidone is N-octyl pyrrolidone.

In some embodiments, the ratio between the carbonyl containing solvent and the N-alkyl pyrrolidone of formula (I) is of about 0.5:1 to about 3:1. In a preferred embodiment, the ratio between the carbonyl containing solvent and the N-alkyl pyrrolidone of formula (I) is of about 1:1 to about 2:1.

In a preferred embodiment, the use of the combination wherein the carbonyl containing solvent is acetophenone and the N-alkyl pyrrolidone is N-octyl pyrrolidone is for increasing the efficacy of prothioconazole. In a more specific embodiment, the ratio between acetophenone and the N-octyl pyrrolidone is of about 2:1.

In a different aspect, the present invention provides an agrochemical composition comprising:

a) at least one triazole fungicide;

b) a carbonyl containing solvent;

c) N-alkyl pyrrolidone of formula (I):

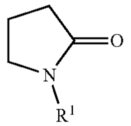

wherein R1 is a straight or branched, saturated or unsaturated, substituted or unsubstituted hydrocarbon group having from 4 to 10 carbon atoms; and d) an effective amount of compound of formula (II):

R2-Z—$(C_mH_{2m}O)_x$-$(C_nH_{2n}O)_y$—H wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50.

In some embodiments, the triazole fungicide is selected from azaconazole, bitertanol, bromuconazole, cyproconazole, diclobutrazol, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, paclobutrazol, penconazole, quinconazole, simeconazole, tetraconazole, triadimenol, triadimefon, triticonazole, uniconazole, uniconazole-P, voriconazole, prothioconazole, difenoconazole, propiconazole, tebuconazole, mefentrifluconazole and any mixture thereof. In a preferred embodiment, the triazole fungicide is prothioconazole, tebuconazole and any mixture thereof. In a more preferred embodiment, the triazole fungicide is prothioconazole.

In some embodiments, the compositions of the present invention comprise a carbonyl containing solvent which is selected from the groups of ketones, amides, ureas, esters, lactones, carbonates and any mixtures thereof.

In some embodiments, the ketone solvent is selected from acetone, diacetone alcohol, methyl ethyl ketone, 2-pentanone, 3-pentanone, 2-hexanone, 3-hexanone, 2-heptanone, 3-heptanone, 4-heptanone, 2-octanone, 3-octanone, 4-octanone, methyl isopropyl ketone, methyl isobutyl ketone, methyl isopentyl ketone, ethyl isopropyl ketone, ethyl isobutyl ketone, ethyl isopentyl ketone, propyl isopropyl ketone, propyl isobutyl ketone, propyl isopentyl ketone, 3,3-dimethyl-2-butanone, 2,4-dimethyl-3-pentanone, 4,4-dimethyl-2-pentanone, 2,6-dimethyl-4-heptanone, 2,2,4,4-tetramethyl-3-pentanone, cyclopentanone, cyclohexanone, cycloheptanone, cyclooctanone, 2,4,6-cycloheptatrien-1-one, acetophenone, propiophenone, 1-(4-methylphenyl)ethanone, 1-(4-ethylphenyl)ethanone, 2-methyl-1-phenyl-1-propanone, 1-(3-ethylphenyl)ethanone, 4-phenyl-2-butanone, 1-phenyl-2-propanone, 1-phenyl-2-butanone, 2-phenyl-3-butanone, butyrophenone, valerophenone and any mixtures thereof. In a preferred embodiment the ketone is cyclohexanone, acetophenone, heptanone and any mixtures thereof. In a more preferred embodiment, the ketone is acetophenone.

In some embodiments, the amide solvent is selected from N-formylmorpholine, N,N-dimethylformamide, N,N-dimethylacetamide, N,N-imethylbenzamide, N,N-dimethyloctanamide, N,N-dimethyldecanamide, N,N-dimethyldec-9-en-1-amide, N,N-dimethyldodedecanamide, N,N-dimethyllactamide, N,N-decylmethylformamide, N-methyl-2-pyrrolidone, N-ethyl-2-pyrrolidone, N-propyl-2-pyrrolidone, N-butyl-2-pyrrolidone, N-pentyl-2-pyrrolidone, N-hexyl-2-pyrrolidone, N-heptyl-2-pyrrolidone, N-octyl-2-pyrrolidone, N-nonyl-2-pyrrolidone, N-decyl-2-pyrrolidone, N-undecenyl pyrrolidone, N-dodecyl-2-pyrrolidone, N-methyl-2-piperidone, N-methylcaprolactam, N-octylcaprolactam, 1,3-dimethyl-2-imidazolidinone, 1,3,4-trimethyl-2-imidazolidinone, 1,3-dimethyl-3,4,5,6-tetrahydro-2(1H)pyrimidinone, 1-heptyl-3-methyl imidazolidinone, 1-heptyl-1,3-dihydro-3-methyl-2H-imidazol2-one and any mixture thereof. In a preferred embodiment the amide is N,N-dimethyldecanamide, N,N-dimethyldecenamide, N,N-dimethyl-octanamide and any mixtures thereof.

In some embodiments, the urea solvent is selected from tetramethylurea, tetraethylurea and any mixture thereof.

In some embodiments, the lactone solvent is selected from butyrolactone, alpha-methyl-gamma-butyrolactone, gamma-valerolactone, delta-valerolactone and any mixture thereof.

In some embodiments, the carbonate solvent is selected from dimethyl carbonate, methyl ethyl carbonate, diethyl carbonate, dipropyl carbonate, diisopropyl carbonate, dibutyl carbonate, dipentyl carbonate, dihexyl carbonate, diheptyl carbonate, dioctyl carbonate, dinonyl carbonate, didecyl carbonate, ethylene carbonate, 4-methyl-1,3-dioxolan-2-one, 4-(methoxymethyl)-1,3-dioxolan-2-one, glycerol carbonate, butylene carbonate, 4,6-dimethyl-3-dioxan-2-one, dibenzyl carbonate and any mixture thereof.

In some embodiments, R1 in the N-alkyl pyrrolidone of formula (I) is a hydrocarbon group having from 7 to 9 carbon atoms. In a preferred embodiment, R1 is a hydrocarbon group having 8 carbon atoms.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9.

In some embodiments, R2 in compound of formula (II) is linear or branched, saturated or unsaturated alkyl radical having from 16 to 18 carbon atoms, Z is an oxygen atom m is an integer equal to 2, n is an integer equal to 3, x is an integer of from 5 to 10 and y is an integer of from 4 to 9.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50.

In some embodiments, R2 in compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20.

In some embodiments, R2 in compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0.

Suitable examples for compounds of formula (II) include but are not limited to Ethylan™ 995 (Akzo Nobel Agrochemicals), Agnique® BP420 (BASF), Agnique® 420 (BASF), Brij™ CS17 (Croda), Atplus™ PFA (Croda), Synergen® Soc (Clariant), Genapol® C-100 (Clariant), Atplus™ 242-SO-(CQ) (Croda), Lutensol® AT types (BASF) such as Lutensol® AT 11, Lutensol® AT 18, Lutensol® AT 25 E, Lutensol® AT 50 E; Lutensol® FA 12 K (BASF), Lutensol® FA 12 (BASF), Araphen® K 100 (BASF), Agnique® CSO-20 (BASF), Agnique® CSO-35 (BASF), Agnique® CSO-40 (BASF), Emulan® A (BASF).

In some embodiments, the composition described herein contains compound of formula (II) in amount equal to or above about 9% based on the total weight of the composition. In a preferred embodiment, the amount is equal to or above about 12% based on the total weight of the composition.

The compositions described herein contain different ratios between the carbonyl containing solvent and the N-alkyl pyrrolidone of formula (I).

In some embodiments, the ratio between the carbonyl containing solvent and the N-alkyl pyrrolidone of formula (I) is of about 0.5:1 to about 3:1. In a preferred embodiment, the ratio between the carbonyl containing solvent and the N-alkyl pyrrolidone of formula (I) is of about 1:1 to about 2:1.

In some embodiments, the amount of triazole fungicide in the composition is about 0.1% to about 50% by weight, based on the total weight of the composition. In a preferred embodiment, the amount of triazole fungicide in the composition is about 10% to about 30% by weight, based on the total weight of the composition. In a more preferred embodiment, the amount of triazole fungicide in the composition is about 20% to about 25% by weight, based on the total weight of the composition. In a specially preferred embodiment, the amount of triazole fungicide in the composition is of about 25% weight, based on the total weight of the composition.

In a preferred embodiment, the carbonyl containing solvent is acetophenone and the N-alkyl pyrrolidone is N-octyl pyrrolidone.

In a preferred embodiment, the triazole fungicide is prothioconazole, the carbonyl containing solvent is acetophenone and the N-alkyl pyrrolidone is N-octyl pyrrolidone.

In a preferred embodiment, the triazole fungicide is prothioconazole, the carbonyl containing solvent is acetophenone and the N-alkyl pyrrolidone is N-octyl pyrrolidone wherein the ratio between the carbonyl containing solvent and the N-octyl pyrrolidone is of about 2:1.

In a preferred embodiment, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound II is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

In a preferred embodiment, the triazole fungicide is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is a nitrogen atom, in is an integer equal to 2, n is an integer equal to 3, x is an integer of 20 to 40 and y is an integer of 0. In specific embodiment, the amount of prothioconazole is about 20% to about 25% by weight, based on the total weight of the composition. In another specific embodiment, the ratio between acetophenone and N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition.

The present invention also provides a method for controlling and/or preventing pests comprising applying an effective amount of the composition disclosed herein to a locus where the pest is to be controlled and/or prevented so as to thereby control and/or prevent the pest.

In some embodiments, the pest is a phytopathogenic harmful fungi.

In some embodiments, the locus where the pest is to be controlled and/or prevented is a crop field.

The present invention also provides a method for controlling and/or preventing phytopathogenic harmful fungi comprising applying an effective amount of the composition disclosed herein to a locus where the phytopathogenic harmful fungi is to be controlled so as to thereby control the phytopathogenic harmful fungi.

The present invention also provides a method of controlling phytopathogenic harmful fungi in a field of crop comprising applying an effective amount of the composition disclosed herein to a field of crop so as to thereby control the phytopathogenic harmful fungi in the field of crop.

In some embodiments, the crop is selected from the group consisting of cotton, flax, grapevines, fruit, vegetables, such as *Rosaceae* sp. (for example pome fruit such as apples and pears, but also stone fruit such as apricots, cherries, almonds and peaches, and berry fruits such as strawberries), Ribesioidae sp., Juglandaceae sp., Betulaceae sp., Anacardiaceae sp., *Fagaceae* sp., *Moraceae* sp., *Oleaceae* sp., Actinidaceae sp., *Lauraceae* sp., Musaceae sp. (for example banana trees and plantations), Rubiaceae sp. (for example coffee), Theaceae sp., Sterculiceae sp., *Rutaceae* sp. (for example lemons, organs and grapefruit); Solanaceae sp. (for example tomatoes), *Liliaceae* sp., Asteraceae sp. (for example lettuce), *Umbelliferae* sp., *Cruciferae* sp., Chenopodiaceae sp., Cucurbitaceae sp. (for example cucumbers), Alliaceae sp. (for example leeks, onions), Papilionaceae sp. (for example peas); main crop plants such as *Gramineae* sp. (for example maize, turfgrass, cereals such as wheat, rye, rice, barley, oats, sorghum/millet and triticale), Asteraceae sp. (for example sunflowers), Brassicaceae sp. (for example white cabbage, red cabbage, broccoli, cauliflower, Brussels sprouts, Pak Choi, kohlrabi, radishes, and rapeseed, mustard, horseradish and cress), Fabacae sp. (for example beans, peanuts), Papilionaceae sp. (for example soya beans), Solanaceae sp. (for example potatoes), Chenopodiaceae sp. (for example sugar beet, fodder beet, chard, beetroot); sugarcane, poppies, olives, coconuts, cocoa, tobacco and useful plants and ornamental plants in gardens and forests; and genetically modified varieties of each of these plants, and the seeds of these plants. In a preferred embodiment, the crop is selected from the group consisting of wheat, rye, rice, barley, oats, sorghum/millet, triticale, maize, rapeseed, beans, peanuts and sunflowers. In a more preferred embodiment, the crop is selected from the group consisting of wheat, rye, rice, barley, oats, sorghum/millet and triticale.

Non-limiting examples of pathogens of fungal diseases which may be treated in accordance with the invention include: diseases caused by powdery mildew pathogens, for example *Blumeria* species, for example *Blumeria graminis, Podosphaera* species, for example *Podosphaera leucotricha, Sphaerotheca* species, for example *Sphaerotheca fuliginea, Uncinula* species, for example *Uncinula necator*, for example *Erysiphe* species; diseases caused by rust disease pathogens, for example *Gymnosporangium* species, for example *Gymnosporangium sabinae; Hemileia* species, for example *Hemileia vastatrix; Phakopsora* species, for example *Phakopsora pachyrhizi* or *Phakopsora meibomiae Puccinia* species, for example *Puccinia recondita, Puccinia graminis* oder *Puccinia* striif ormis, *Uromyces* species, for example *Uromyces* app endiculatus, diseases caused by pathogens from the group of the Oomycetes, for example *Albugo* species, for example *Albugo Candida, Bremia* species, for example *Bremia* laciucaer, *Peronospora* species, for example *Peronospora pisi* or P. brassicaer, *Phytophthora* species, for example *Phytophthora infestans, Plasmopara* species, for example *Plasmopara viticola, Pseudoperonospora* species, for example *Pseudoperonospora humuli* or *Pseudoperonospora cubensis, Pythium* species, for example *Pythium* ultimunv, leaf blotch diseases and leaf wilt diseases caused, for example, by *Alternaria* species, for example *Alternaria* solanv, *Cercospora* species, for example *Cercospora beticola*, Cladiosporium species, for example Cladiosporium cucumerinunr, *Cochliobolus* species, for example *Cochliobolus sativus* (conidial form: *Drechslera*, syn: *Helminthosporium*) or *Cochliobolus miyabeanus, Colletotrichum* species, for example *Colletotrichum* lindemuthaniunv, *Corynespora* species, for example *Corynespora cassiicola, Cycloconium* species, for example *Cycloconium* oleaginunv, *Diaporthe* species, for example *Diaporthe* citrv, *Elsinoe* species, for example *Elsinoe fawcettii, Gloeosporium* species, for example *Gloeosporium laeticolor, Glomerella* species, for example *Glomerella cingulata, Guignardia* species, for example *Guignardia* bidwellv, *Leptosphaeria* species, for example *Leptosphaeria maculans, Magnaporthe* species, for example *Magnaporthe grisea, Microdochium* species, for example *Microdochium* nivaler, *Mycosphaerella* species, for example *Mycosphaerella graminicola* (also known as *Septoria tritici*), *Mycosphaerella arachidicola* or *Mycosphaerella* fijiens, *Phaeosphaeria* species, for example *Phaeosphaeria* nodorunr, *Pyrenophora* species, for example *Pyrenophora teres* or *Pyrenophora tritici* rep enth, *Ramularia* species, for example *Ramularia collo-cygni* or *Ramularia areola, Rhynchosporium* species, for example *Rhynchosporium secalis, Septoria* species, for example *Septoria apii* or *Septoria* lycopersicv, *Stagonospora* species, for example *Stagonospora* nodorunr, *Typhula* species, for example *Typhula incarnata, Venturia* species, for example *Venturia* inaequal, root and stem diseases caused, for example, by *Corticium* species, for example *Corticium graminearum, Fusarium* species, for example *Fusarium oxysporum\Gaeumannomyces* species, for example *Gaeumannomyces graminis, Plasmodiophora* species, for example *Plasmodiophora brassica, Rhizoctonia* species, for example *Rhizoctonia solani, Sarocladium* species, for example *Sarocladium oryzae; Sclerotium* species, for example *Sclerotium oryzae, Tapesia* species, for example *Tapesia acuformis, Thielaviopsis* species, for example *Thielaviopsis basicola*, ear and panicle diseases (including corn cobs) caused, for example, by *Alternaria* species, for example *Alternaria* spp.; *Aspergillus* species, for example *Aspergillus flavus, Cladosporium* species, for example *Cladosporium cladosporioides, Claviceps* species, for example *Claviceps purpurea, Fusarium* species, for example *Fusarium* culmorunr, *Gibberella* species, for example *Gibberella zeae Monographella* species, for example *Monographella nivalis*, Stagnospora species, for example Stagnospora nodorunr, diseases caused by smut fungi, for example *Sphacelotheca* species, for example *Sphacelotheca reiliana, Tilletia* species, for example *Tilletia caries* or *Tilletia* controversy, *Urocystis* species, for example *Urocystis occulta, Ustilago* species, for example *Ustilago nuda*, fruit rot caused, for example, by *Aspergillus* species, for example *Aspergillus flavus, Botrytis* species, for example *Botrytis cinerea, Monilinia* species, for example *Monilinia* Ιαχα, *Penicillium* species, for example *Penicillium expansum* or *Penicillium purpurogenum, Rhizopus* species, for example *Rhizopus stolonifer, Sclerotinia* species, for example *Sclerotinia sclerotiorum*, Verticilium species, for example Verticilium *alboatrum*, seed- and soil-borne rot and wilt diseases, and also diseases of seedlings, caused, for example, by *Alternaria* species, for example *Alternaria* brasside ola *Aphanomyces* species, for example *Aphanomyces euteiches, Ascochyta* species, for example *Ascochyta* lends, *Aspergillus* species, or example *Aspergillus flavus, Cladosporium* species, for example *Cladosporium herbarum, Cochliobolus* species, for example *Cochliobolus sativus* (conidial form: *Drechslera, Bipolaris* Syn: *Helminthosporium*), *Colletotrichum* species, for example *Colletotrichum coccodes, Fusarium* species, for example *Fusarium culmorum, Gibberella* species, for example *Gibberella zeae Macrophomina* species, for example *Macrophomina phaseolina, Microdochium* species, for example *Microdochium nivale, Monographella* species, for example *Monographella nivalis, Penicillium* species, for example *Penicillium expansum, Phoma* species, for example *Phoma lingam, Phomopsis* species, for example *Phomopsis* so ae *Phytophthora* species, for example *Phytophthora cactorum, Pyrenophora* species, for example *Pyrenophora graminea, Pyricularia* species, for example *Pyricularia* oryzac, *Pythium* species, for example *Pythium ultimum, Rhizoctonia* species, for example *Rhizoctonia* solanv, *Rhizopus* species, for example *Rhizopus oryzae; Sclerotium* species, for example *Sclerotium rolfsii, Septoria* species, for example *Septoria nodorum, Typhula* species, for example *Typhula incarnata, Verticillium* species, for example *Verticillium dahliae*, cancers, galls and witches' broom caused, for example, by *Nectria* species, for example *Nectria galligena*, wilt diseases caused, for example, by *Verticillium* species, for example *Verticillium* longisporunr, *Fusarium* species, for example *Fusarium* oxysporurrv, deformations of leaves, flowers and fruits caused, for example, by *Exobasidium* species, for example *Exobasidium vexans, Taphrina* species, for example *Taphrina deformans*, degenerative diseases in woody plants, caused, for example, by Esca species, for example *Phaeomoniella chlamydospora, Phaeoacremonium aleophilum* or Fomitiporiamediterranean *Ganoderma* species, for example *Ganoderma boninense*, diseases of plant tubers caused, for example, by *Rhizoctonia* species, for example *Rhizoctonia* solanv, *Helminthosporium* species, for example *Helminthosporium* solanv, diseases caused by bacterial pathogens, for example *Xanthomonas* species, for example *Xanthomonas campestris* pv. *oryzae, Pseudomonas* species, for example *Pseudomonas syringae* pv. *lachrymans, Erwinia* species, for example *Erwinia amylovora*, Liberibacter species, for example Liberibacter *asiaticus*, Xyella species, for example *Xylella fastidiosa, Ralstonia* species, for example *Ralstonia solanacearum, Dickeya* species, for example *Dickeya* solanv, *Clavibacter* species, for example *Clavibacter michiganensis, Streptomyces* species, for example *Streptomyces scabies*, diseases of soya beans: fungal diseases on leaves, stems, pods and seeds caused, for example, by *Alternaria* leaf spot (*Alternaria spec atrans tenuissima*), Anthracnose (*Colletotrichum* gloeosporoides *dematium* var. *truncatum*), brown spot (*Septoria glycines*), *cercospora* leaf spot and blight (*Cercospora kikuchii*), *choanephora* leaf blight (*Choanephora infundibulifera trispora* (Syn.j), *dactuliophora* leaf spot (*Dactuliophora glycines*), downy mildew (*Peronospora manshurica*), *drechslera* blight (*Drechslera* glycini), frogeye leaf spot (*Cercospora sojina*), *leptosphaerulina* leaf spot (*Leptosphaerulina trifolii*), phyllostica leaf spot (*Phyllosticta* sojaecola), pod and stem blight (*Phomopsis sojae*), powdery mildew (*Microsphaera diffusa*), *pyrenochaeta* leaf spot (*Pyrenochaeta glycines*), *rhizoctonia* aerial, foliage, and web blight (*Rhizoctonia solani*), mst (*Phakopsora pachyrhizi, Phakopsora meibomiae*), scab (*Sphaceloma glycines*), *stemphylium* leaf blight (*Stemphylium botryosum*), sudden death syndrome (*Fusarium virguliforme*), target spot (*Corynespora cassiicola*). Fungal diseases on roots and the stem base caused, for example, by black root rot (*Calonectria crotalariae*), charcoal rot (*Macrophomina phaseolina*), *fusarium* blight or wilt, root rot, and pod and collar rot (*Fusarium* oxysporum, *Fusarium* orthoceras, *Fusarium* semitectum, *Fusarium equiseti*), *mycoleptodiscus* root rot (*Mycoleptodiscus terrestris*), *neocosmospora* (*Neocosmospora vasinfecta*), pod and stem blight (*Diaporthe phaseolorum*), stem canker (*Diaporthe phaseolorum* var. *caulivora*), *phytophthora* rot (*Phytophthora megasperma*), brown stem rot (*Phialophora gregata*), pythiumrot (*Pythium aphanidermatum, Pythium irregulare, Pythium debaryanum, Pythium myriotylum, Pythium ultimum*), *rhizoctonia* root rot, stem decay, and damping-off (*Rhizoctonia solani*), *sclerotinia* stem decay (*Sclerotinia sclerotiorum*), *sclerotinia* southern blight (*Sclerotinia rolfsii*), *thielaviopsis* root rot (*Thielaviopsis basicola*).

The phytopathogenic harmful fungi is selected from *Septoria* species, *Fusarium* species, *Puccinia* species, Erisyphe species, *Drechslera* species, *Ramularia* species, *Mycosphaerella* species and *Rhynchosporium* species.

In some embodiments, the phytopathogenic harmful fungi is selected from *Puccinia recondita, Septoria Fusarium culmorum, Pyrenophora teres* and *Rhynchosporium secalis.*

In some embodiments, the composition is applied in an amount from about 0.1 L/ha to about 2 L/ha. In some embodiments, the composition is applied in an amount from about 0.4 L/ha to about 1 L/ha.

In some embodiments, the composition is applied in an amount from about 20 g/ha of triazole to about 500 g/ha of triazole. In some embodiments, the composition is applied in an amount from about 100 g/ha of triazole to about 250 g/ha of triazole.

In some embodiments, the triazole in the composition is prothioconazole.

The present invention also provides use of the composition disclosed herein for controlling and/or preventing pests.

The present invention also provides use of the composition disclosed herein for controlling phytopathogenic harmful fungi.

The present invention also provides the compositions disclosed herein for use in controlling and/or preventing pests.

The present invention also provides the compositions disclosed herein for use in controlling phytopathogenic harmful fungi.

The present invention also provides a method for reducing deoxynivalenol (DON) mycotoxin in a field of crop comprising applying an effective amount of the compositions disclosed herein to a crop infected by fungi of the *Fusarium* species.

In some embodiments, the crop is selected from the group consisting of wheat, rye, rice, barley, oats, sorghum/millet, triticale, maize, rapeseed, beans, peanuts and sunflowers.

In some embodiments, the crop is wheat.

In some embodiments, the *Fusarium* specie is *Fusarium culmorum.*

The present invention also provides use of the compositions disclosed herein for reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers.

In some embodiments, the crop is wheat.

The present invention also provides the compositions disclosed herein for use in reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers.

In some embodiments, the crop is wheat.

In different aspect the present invention provides the use of a compound of formula (II):

$$R2\text{-}Z\text{—}(CmH2mO)x\text{-}(CnH2nO)y\text{—}H$$

wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50, for increasing the efficacy of one or more triazole fungicide.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is a nitrogen atom, in is an integer equal to 2, n is an integer equal to 3, x is an integer of from 3 to 50 and y is an integer of from 3 to 50.

In some embodiments, R2 in compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20.

In some embodiments, R2 in compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0.

In some embodiments, the amount of compound of formula (II) is equal to or above about 9% based on the total weight of the composition. In some embodiments, the amount of compound of formula (II) is equal to or above about 12% based on the total weight of the composition.

In some embodiments, the triazole fungicide is selected from azaconazole, bitertanol, bromuconazole, cyproconazole, diclobutrazol, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, paclobutrazol, penconazole, quinconazole, simeconazole, tetraconazole, triadimenol, triadimefon, triticonazole, uniconazole, uniconazole-P, voriconazole, prothioconazole, difenoconazole, propiconazole, tebuconazole, mefentrifluconazole and any mixture thereof. In some embodiments, the triazole fungicide is prothioconazole or tebuconazole. In some embodiments, the triazole fungicide is prothioconazole.

In some preferred embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated alkyl radical having from 16 to 18 carbon atoms, Z is an oxygen atom, in is an integer equal to 2, n is an integer equal to 3, x is an integer of from 3 to 10 and y is an integer of from 3 to 9, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated alkyl radical having from 16 to 18 carbon atoms, Z is a nitrogen atom, in is an integer equal to 2, n is an integer equal to 3, x is an integer of from 3 to 50 and y is an integer of from 0 to 50, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, R2 in compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0, wherein compound of formula (II) is used for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

The present invention also provides with a method of treating plants or plants parts with a composition comprising of one or more triazole fungicide with compound of formula (II):

$$R2\text{-}Z—(CmH2mO)x\text{-}(CnH2nO)y—H$$

wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atoms, m is an integer equal to 2, n is an integer equal to 3, x is an integer of from 3 to 50 and y is an integer of from 0 to 50, wherein the compound of formula (II) is for increasing the efficacy of the one or more triazole(s).

In some embodiments, R2 in compound of formula (II) is linear or branched, saturated or unsaturated alkyl radical having from 16 to 18 carbon atoms, Z is an oxygen atom, in is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9.

In some embodiments, R2 in compound of formula (II) is linear or branched, saturated or unsaturated alkyl radical having from 16 to 18 carbon atoms, Z is an oxygen atom, in is an integer equal to 2, n is an integer equal to 3, x is an integer of from 5 to 10 and y is an integer of from 4 to 9.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50.

In some embodiments, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50.

In some embodiments, R2 in compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20.

In some embodiments, R2 in compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0.

In some embodiments, the amount of compound of formula (II), in the method disclosed herein, is equal to or above about 9% based on the total weight of the composition. In some embodiments, the amount of compound of formula (II), in the method disclosed herein, is equal to or above about 12% based on the total weight of the composition.

In some embodiments, the triazole fungicide is selected from azaconazole, bitertanol, bromuconazole, cyproconazole, diclobutrazol, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, paclobutrazol, penconazole, quinconazole, simeconazole, tetraconazole, triadimenol, triadimefon, triticonazole, uniconazole, uniconazole-P, voriconazole, prothioconazole, difenoconazole, propiconazole, tebuconazole, mefentrifluconazole and any mixture thereof. In some embodiments, the triazole fungicide is prothioconazole or tebuconazole. In some embodiments, the triazole fungicide is prothioconazole.

In some preferred embodiments, in the method disclosed herein, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

In some embodiments, in the method disclosed herein, R2 in compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0, wherein compound of formula (II) is for increasing the efficacy of prothioconazole. In a specific embodiment, the amount of compound of formula (II) is equal to or above about 9% based on the total weight of the composition. In another specific embodiment, the amount of compound of formula (II) is equal to or above about 12% based on the total weight of the composition.

The present invention also provides a method for reducing deoxynivalenol (DON) mycotoxin in a field of crop comprising applying an effective amount of the composition comprising:

a) at least one triazole fungicide;

b) a carbonyl containing solvent;

c) N-alkyl pyrrolidone of formula (I):

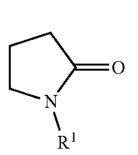

wherein R1 is a straight or branched, saturated or unsaturated, substituted or unsubstituted hydrocarbon group having from 4 to 10 carbon atoms; and d) an effective amount of compound of formula (II):

$$R2\text{-}Z—(C_mH_{2m}O)_x\text{-}(C_nH_{2n}O)_y—H$$

wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50, to a crop infected by fungi of the *Fusarium* species.

In some embodiments, the crop is selected from the group consisting of wheat, rye, rice, barley, oats, sorghum/millet, triticale, maize, rapeseed, beans, peanuts and sunflowers.

In some embodiments, the crop is wheat.

In some embodiments, the *Fusarium* specie is *Fusarium culmorum.*

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound II is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In a preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20. In specific embodiment, the amount of prothioconazole is about 20% to about 25% by weight, based on the total weight of the composition. In another specific embodiment, the ratio between acetophenone and the N-octyl pyrrolidone is of 2:1.

In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the method for reducing deoxynivalenol (DON) mycotoxin in a field of crop comprises applying an effective amount of the composition wherein, the triazole is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

The present invention also provides use of the compositions comprising:

a) at least one triazole fungicide;

b) a carbonyl containing solvent;

c) N-alkyl pyrrolidone of formula (I):

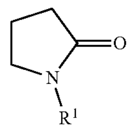

wherein R1 is a straight or branched, saturated or unsaturated, substituted or unsubstituted hydrocarbon group having from 4 to 10 carbon atoms; and d) an effective amount of compound of formula (II):

$$R2\text{-}Z—(C_mH_{2m}O)_x\text{-}(C_nH_{2n}O)_y—H$$

wherein R2 is linear or branched, saturated or unsaturated alkyl radical having from 14 to 20 carbon atoms; or R2 is linear or branched, saturated or unsaturated acyl radical having from 14 to 20 carbon atoms; or any combination thereof, Z is selected from oxygen or nitrogen atom, m is an integer equal to 2, n is an integer equal to 3, x is an integer of from 3 to 50 and y is an integer of from 0 to 50, for reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers.

In some embodiments, the crop is wheat.

The present invention also provides the compositions disclosed herein for use in reducing deoxynivalenol (DON) mycotoxin in crop infected by fungi of the *Fusarium* species.

In some embodiments, the *Fusarium* specie is *Fusarium culmorum.*

In some embodiments, the crop is selected from the group consisting of wheat, rye, rice, barley, oats, sorghum/millet, triticale, maize, rapeseed, beans, peanuts and sunflowers.

In some embodiments, the crop is wheat.

In preferred embodiment, the use for reducing deoxynivalenol (DON) mycotoxin in crop infected by fungi of the *Fusarium* species comprises applying an effective amount of the composition wherein, the triazole is prothioconazole, the carbonyl containing solvent is acetophenone, the N-alkyl pyrrolidone is N-octyl pyrrolidone and compound II is linear or branched, saturated or unsaturated alkyl radical having from 16 to 18 carbon atoms, Z is an oxygen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 3 to 10 and y is an integer of from 3 to 9. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is an oxygen atom, m is an integer equal to 2, n is an integer equal to 3, x is an integer of from 5 to 10 and y is an integer of from 4 to 9. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 0 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated alkyl radical having from 16 to 18 carbon atoms, Z is a nitrogen atom, m is an integer equal to 2, n is an integer equal to 3, x is an integer of from 3 to 50 and y is an integer of from 3 to 50. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is an oxygen atom, m is an integer equal to 2, n is an integer equal to 3, x is an integer of from 3 to 40 and y is an integer of from 0 to 20. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound of formula (II) is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

In preferred embodiment, the use for reducing deoxynivalenol (DON) mycotoxin in crop infected by fungi of the *Fusarium* species wherein, the triazole is prothioconazole, the carbonyl containing solvent is acetophenone, the N-alkyl pyrrolidone is N-octyl pyrrolidone and compound of formula (II) is linear or branched, saturated or unsaturated acyl radical having from 16 to 18 carbon atoms, Z is a nitrogen atom, m is an integer equal to 2, n is an integer equal to 3, x is an integer of 20 to 40 and y is an integer of 0. In specific embodiment, the amount of prothioconazole is about 20% to about 25% by weight, based on the total weight of the composition. In another specific embodiment, the ratio between acetophenone and the N-octyl pyrrolidone is of 2:1. In another specific embodiment, compound II is in amount equal to or above about 9% based on the total weight of the composition. In another specific embodiment, compound of formula (II) is in amount equal to or above about 12% based on the total weight of the composition. In a more specific embodiment, the *Fusarium* specie is *Fusarium culmorum* and the crop is wheat.

All the compositions and/or combinations of the invention are liquid compositions. These compositions include the following formulation types: DC (GCPF formulation code for dispersible concentrate); EC (GCPF formulation code for emulsion concentrate); EW (GCPF formulation code for oil-in-water emulsion); ES (GCPF formulation code for emulsion for seed treatment), FS (GCPF formulation code for multiphase concentrate for seed treatment), EO (GCPF formulation code for water-in-oil emulsion; ME (GCPF formulation code for microemulsion; SE (GCPF formulation code for suspoemulsion); SL (GCPF formulation code for water-soluble concentrate); CS (GCPF formulation code for capsule suspension) and AL (GCPF formulation code for ready-to-use liquid formulation, other liquids for undiluted application). Particular preference is given to emulsion concentrates (EC formulation type). An emulsion concentrate is typically understood to mean a composition that forms an oil-in-water emulsion when mixed with water. The emulsion is typically formed spontaneously. The concentrate preferably takes the form of a homogeneous solution. It is typically virtually free of dispersed particles. More particularly, the formulations of the invention provide stable emulsion concentrate formulations of triazoles, optionally in combination with further organic, water-insoluble active ingredients, preferably selected from fungicides and insecticides, for treatment of plants.

All the compositions and/or combinations of the invention may comprise further one or more active fungicidal, insecticidal or herbicidal ingredients. Preferably, the compositions of the invention comprise one or more active insecticidal or fungicidal ingredients, more preferably one or more active fungicidal ingredients.

Preferred insecticidal components are, for example, imidacloprid, nitenpyram, acetamiprid, thiacloprid, thiamethoxam, clothianidin, cyantraniliprole, chlorantraniliprole, flubendiamide, tetraniliprole, cyclaniliprole, spirodiclofen, spiromesifen, spirotetramat, abamectin, acrinathrin, chlorfenapyr, emamectin, ethiprole, fipronil, flonicamid, flupyradifurone, indoxacarb, metaflumizone, methoxyfenozid, milbemycin, pyridaben, pyridalyl, silafluofen, spinosad, sulfoxaflor and triflumuron.

Preferred fungicidal components are, for example, bixafen, fenamidone, fenhexamid, fluopicolide, fluopyram, fluoxastrobin, iprovalicarb, isotianil, isopyrazam, pencycuron, penflufen, propineb, trifloxystrobin, ametoctradin, amisulbrom, azoxystrobin, benthiavalicarb-isopropyl, benzovindiflupyr, boscalid, carbendazim, chlorothanonil, cyazofamid, cyflufenamid, cymoxanil, cyproconazole, difenoconazole, ethaboxam, epoxiconazole, famoxadone, fluazinam, fluquinconazole, flusilazole, flutianil, fluxapyroxad, isopyrazam, kresoxim methyl, mancozeb, mandipropamid, metconazol, pyriofenone, folpet, metaminostrobin, oxathiapiprolin, penthiopyrad, picoxystrobin, probenazole, proquinazid, pydiflumetofen, pyraclostrobin, sedaxane, spiroxamin, tebufloquin, tetraconazole, valiphenalate, zoxamide, ziram, N-(5-chloro sopropylbenzyl)-N-cyclopropyl-3(difluoromethyl)-5-fluoro-1-methyl-iH-pyrazole carboxamide, N-(5-chloro-2-isopropylbenzyl)-N-5 cyclopropyl-3-(difluoromethyl) fluoro-1-methyl-iH-pyrazole-4-carboxamide, 2-{3-[2-(1-{[3,5bis(difluoromethyl)-1H-pyrazol-1-yl]acetyl}piperidin-4-yl)-1,3-thiazol-4-yl]-4,5-dihydro-1,2-oxazol-5yl}phenyl methanesulfonate, 2-{3-[2-(1-{[3,5-bis(difluoromethyl)-1H-pyrazol yl]acetyl}piperidin-4yl)-1,3-thiazol-4-yl]-4,5-dihydro-1,2-oxazol-5-yl}chlorophenylmethane-sulfonate, (3S,6S,7R,8R)-8-benzyl-3-[({3-[(isobutyryloxy)methoxy]-4-methoxy-pyridin-2-yl}carbonyl)amino]-6-methyl-4,9-dioxo-1,5-dioxonan-7-yl 2-methylpropanoate (lyserphenvalpyr).

Particularly preferred fungicidal mixing partners for prothioconazole are, for example: spiroxamin, bixafen, fluoxastrobin, trifloxystrobin, N-(5-chloro-2-isopropylbenzyl)-N-cyclopropyl-3-(difluoromethyl)-5-fluoro-1-methyl-iH-pyrazole-4-carboxamide, (3S,6S,7R,8R)-8-benzyl-3-[({3 [(isobutyryloxy)methoxy]-4-methoxypyridin-2-yl}carbonyl)amino]-6-methyl-4,9-dioxo-1,5-dioxonan-7yl 2-methylpropanoate (lyserphenvalpyr) and fluopyram.

In addition, all the compositions and/or combinations of the invention may optionally comprise liquid fillers, for example vegetable or mineral oils or esters of vegetable or mineral oils. Suitable vegetable oils are all oils which can typically be used in agrochemicals and can be obtained from plants. Examples include sunflower oil, rapeseed oil, olive oil, castor oil, colza oil, corn oil, cottonseed oil, walnut oil, coconut oil and soya oil. Possible esters are, for example, ethylhexyl palmitate, ethylhexyl oleate, ethylhexyl myristate, ethylhexyl caprylate, isopropyl myristate, isopropyl palmitate, methyl oleate, methyl palmitate, ethyl oleate. Possible mineral oils are Exxsol D100 and white oils.

All the compositions and/or combinations of the invention may comprise further additives such as emulsifiers, penetrants, wetting agents, spreading agents and/or retention agents. Suitable substances are all of those which can typically be used for this purpose in agrochemicals. Suitable additives are, for example, organomodified polysiloxanes, e.g. BreakThru® OE444, BreakThru® S240, Silwett® L77, Silwett® 408; tristyrylphenol ethoxylate, e.g. POE-16 POLYSTEP® TSP-16; ethoxy (5) tridecyl mono/di phosphate, e.g. Crodafos™ TSA; polyalkoxylated butyl ether, e.g. Witconol™ NS 500 LQ; Sorbitan monolaurate ethoxylated (20EO), e.g. Tureen® 20.

Additional suitable additives which may be present in all the compositions of the invention are defoamers, preservatives, antioxidants, dyes and inert fillers.

Suitable defoamers are all substances which can typically be used for this purpose in agrochemicals. Preference is given to silicone oils, silicone oil formulations, magnesium stearate, phosphinic acids and phosphonic acids. Examples are Silcolapse® 482 from Bluestar Silicones, Silfoam® SCI 132 from Wacker [dimethylsiloxanes and-silicones, CAS No. 63148-62-9], SAG 1538 or SAG 1572 from Momentive [dimethylsiloxanes and-ilicones, CAS-Nr. 63148-62-9] or Fluowet® PL 80.

Possible preservatives are all substances which can typically be used for this purpose in agrochemicals. Suitable preservatives are, for example, formulations comprising 5-chloro-2-methyl-4-isothiazolin-3-one [CIT; CAS No. 26172-55-4], 2-methyl-4-isothiazolin-3-one [MIT, CAS No. 2682-204] or 1,2-benzisothiazol-3(2H)-one [BIT, CAS No. 2634-33-5]. Examples include Preventol® D7 (Lanxess), Kathon® CG/ICP (Rohm & Haas), Acticide® SPX (Thor GmbH) and Proxel® GXL (ArchChemicals).

Suitable antioxidants are all substances which can typically be used for this purpose in agrochemicals. Preference is given to butylhydroxytoluene [3,5-di-tert-butyl-4-hydroxytoluene, CAS No. 128-37-0] and citric acid.

Possible dyes are all substances which can typically be used for this purpose in agrochemicals. Examples include titanium dioxide, carbon black, zinc oxide, blue pigments, red pigments and Permanent Red FGR.

Suitable inert fillers are all substances which can typically be used for this purpose in agrochemicals and which do not function as thickeners. Preference is given to inorganic particles such as carbonates, silicates and oxides, and also organic substances such as urea-formaldehyde condensates. Examples include kaolin, rutile, silicon dioxide ("finely divided silica"), silica gel and natural and synthetic silicates, and additionally talc.

All the compositions and/or combinations of the invention can be applied in undiluted form or diluted with water. In general, they are diluted with at least one part water, preferably with 10 parts water and more preferably with at least 100 parts water, for example with 1 to 10000, preferably 10 to 5000 and more preferably with 50 to 24,000 parts water, based on one part of the formulation.

The present invention likewise provides an emulsion obtainable by mixing water with the liquid compositions of the invention. The mixing ratio of water to emulsion concentrate may be in the range from 1500:1 to 1:1; preferably 500:1 to 10:1.

The dilution is achieved by pouring the emulsion concentrates of the invention into the water. For rapid mixing of the concentrate with water, it is customary to use agitation, for example stirring. However, agitation is generally unnecessary. Even though the temperature for the dilution operation is an uncritical factor, dilutions are typically conducted at temperatures in the range from 00° C. to 50° C., especially at 10° C. to 30° C. or at ambient temperature.

The water used for dilution is generally tap water. The water may, however, already contain water soluble or finely dispersed compounds which are used in crop protection, for instance nutrients, fertilizers or pesticides. It is possible to add various kinds of oils, wetting agents, adjuvants, fertilizers or micronutrients and further pesticides (e.g. herbicides, insecticides, fungicides, growth regulators, safeners) to the emulsion of the invention in the form of a premix or, if appropriate, not until shortly before use (tank-mix). These may be added to the compositions of the invention in a weight ratio of 1:100 to 100:1, preferably 1:10 to 10:1.

The user will apply the compositions of the invention typically from a pre-dosing system, a backpack sprayer, a spraying tank, a spraying aircraft or an irrigation system; the compositions of the invention is typically diluted to the desired deployment concentration with water, buffer and/or further auxiliaries, which affords the ready-to-use spray liquid or agrochemical composition of the invention. Typically, 20 to 2000 liters, preferably 50 to 400 liters, of the ready-to-use spray liquid are deployed per hectare of useful agricultural area.

The generally diluted compositions of the invention are applied mainly by spraying, especially spraying of the leaves. Application can be conducted by spraying techniques known to those skilled in the art, for example using water as carrier and amounts of spray liquid of about 50 to 1000 liters per hectare, for example from 100 to 200 liters per hectare.

The novel triazole-containing compositions have advantageous properties in respect of the treatment of plants; more particularly, they feature good use properties, high stability and high fungicidal activity.

The invention is illustrated by the following examples without limiting it thereby.

EXAMPLES

Example 1—Prothioconazole Formulation A

TABLE 1

| Component | % by weight |
|---|---|
| Prothioconazole Tech | 25.5 |
| Synergen SOC (C10/C12 fatty alcohol-3-8 EO-3-8 PO & C16/C18 fatty alcohol-5-10 EO-4-9 PO) | 25.5 |
| N-octylpyrrolidone (NOP) | 19.9 |
| Genagen 4296 (Dimethyldecanamide) | 20.0 |
| CO 40 (castor oil ethoxylate, POE-40) | 9.1 |

1. Genagen 4296 and NOP were added to reaction vessel.
2. Prothioconazole tech. was added to the reaction vessel while mixing.
3. Synergen SOC and CO 40 were added gradually the to the reaction vessel while mixing until the solution was clear.

Example 2—Prothioconazole Formulation B

TABLE 2

| Component | % by weight |
|---|---|
| Prothioconazole Tech | 25.5 |
| Synergen SOC (C10/C12 fatty alcohol-3-8 EO-3-8 PO & C16/C18 fatty alcohol-5-10 EO-4-9 PO) | 25.5 |
| N-octylpyrrolidone (NOP) | 19.9 |
| Genagen 4296 (Dimethyldecanamide) | 20.0 |
| Genapole X-80 (Isotridecyl polyethylene glycol ether with 8 moles ethylene oxide) | 9.1 |

1. Genagen 4296 and NOP were added to reaction vessel.
2. Prothioconazole tech. was added to the reaction vessel while mixing.
3. Synergen SOC and Genapole X-80 were added gradually the to the reaction vessel while mixing until the solution was clear.

Example 3—Prothioconazole Formulation C

TABLE 3

| Component | % by weight |
|---|---|
| Prothioconazole Tech | 25.5 |
| Synergen SOC (C10/C12 fatty alcohol-3-8 EO-3-8 PO & C16/C18 fatty alcohol-5-10 EO-4-9 PO) | 25.5 |
| Genagen 4296 (Dimethyldecanamide) | 39.9 |
| CO 40 (castor oil ethoxylate, POE-40) | 9.1 |

1. Genagen 4296 and NOP were added to reaction vessel.
2. Prothioconazole tech. was added to the reaction vessel while mixing.
3. Synergen SOC and CO 40 were added gradually the to the reaction vessel while mixing until the solution was clear.

Example 4—Prothioconazole Formulation D

TABLE 4

| Component | % by weight |
|---|---|
| Prothioconazole Tech | 25.5 |
| Synergen SOC (C10/C12 fatty alcohol-3-8 EO-3-8 PO & C16/C18 fatty alcohol-5-10 EO-4-9 PO) | 25.5 |
| Genagen 4296 (Dimethyldecanamide) | 39.9 |
| Genapole X-80 (Isotridecyl polyethylene glycol ether with 8 moles ethylene oxide ) | 9.1 |

1. Genagen 4296 and NOP were added to reaction vessel.
2. Prothioconazole tech. was added to the reaction vessel while mixing.
3. Synergen SOC and Genapole X-80 were added gradually the to the reaction vessel while mixing until the solution was clear.

Example 5—Prothioconazole Formulation E

TABLE 5

| Component | % by weight |
|---|---|
| Prothioconazole Tech | 24.6 |
| Genagen 4296 (Dimethyldecanamide) | 22.2 |
| N-octylpyrrolidone (NOP) | 22.2 |
| CO 20 (castor oil ethoxylate, POE-20) | 3.0 |
| Rhodaphac-PA/23 (ethoxylated fatty alcohol, phosphate ester) | 2.0 |
| Synergen SOC (C10/C12 fatty alcohol-3-8 EO-3-8 PO & C16/C18 fatty alcohol-5-10 EO-4-9 PO) | 26.0 |

1. Genagen 4296, NOP and Synergen SOC were charged to reaction vessel and heat up to 35° C.
2. At 35° C. Prothioconazole tech. was added and mixed until full dissolving was obtained.
3. At 35° C. Rhodaphac-PA/23 and CO 20 were added and mixed until the solution was clear.
4. The solution was cooled to 25° C.
5. The solution was filtered through 2.5 μm filter.

Example 6—Prothioconazole Formulation F

TABLE 6

| Component | % by weight |
|---|---|
| Prothioconazole Tech | 24.5 |
| Steposol Met 10U (N,N-dimethyl 9-decenamide) | 29.0 |
| N-octylpyrrolidone (NOP) | 14.5 |
| CO 20 (castor oil ethoxylate, POE-20) | 4.2 |
| Rhodaphac-PA/23 (ethoxylated fatty alcohol, phosphate ester) | 2.8 |
| Synergen SOC (C10/C12 fatty alcohol-3-8 EO-3-8 PO & C16/C18 fatty alcohol-5-10 EO-4-9 PO) | 25.0 |

1. Steposol Met 10U. NOP and Synergen SOC were charged to reaction vessel and heat up to 35° C.
2. At 35° C. Prothioconazole tech. was added and mixed until full dissolving was obtained.
3. At 35° C. Rhodaphac-PA/23 and CO 20 were added and mixed until the solution was clear.
4. The solution was cooled to 25° C.

5. The solution was filtered through 2.5 μm filter.

Example 7—Prothioconazole Formulation G

TABLE 7

| Component | % by weight |
|---|---|
| Prothioconazole Tech | 24.0 |
| Acetophenone | 29.3 |
| N-octylpyrrolidone (NOP) | 14.7 |
| TSP16 (Tristyrylphenol ethoxylate 16) | 12.0 |
| Crodafos T5A (ethoxy (5) tridecyl mono/di phosphate) | 3.0 |
| Witconol NS 500 LQ (EO, PO polyalkoxylated butyl ether) | 2.0 |
| Agnique BP (C16/C18 fatty alcohol EO, PO) | 15.0 |

1. Acetophenone, NOP and Agnique BP were charged to reaction vessel and heat up to 35° C.
2. At 35° C. Prothioconazole tech. was added and mixed until full dissolving was obtained.
3. At 35° C. TSP16, Crodafos T5A and Witconol NS 500 LQ were added and mixed until the solution was clear.
4. The solution was cooled to 25° C.
5. The solution was filtered through 2.5 μm filter.

Example 8— Prothioconazole Formulation H

TABLE 8

| Component | % by weight |
|---|---|
| Prothioconazole Tech | 24.8 |
| 2-Heptanone | 28.8 |
| N-octylpyrrolidone (NOP) | 14.4 |
| TSP16 (Tristyrylphenol ethoxylate 16) | 5.5 |
| Crodafos T5A (ethoxy (5) tridecyl mono/di phosphate) | 2.5 |
| Witconol NS 500 LQ (EO, PO polyalkoxylated butyl ether) | 2.0 |
| Soprophor 3D33 (2,4,6-tris(1-phenylethyl)polyoxyethylenated phosphates) | 2.0 |
| Tween 20 (Sorbitan monolaurate ethoxylated 20EO) | 2.0 |
| Synergen SOC (C10/CT2 fatty alcohol-3-8 EO-3-8 PO & C16/C18 fatty alcohol-5-10 EO-4-9 PO) | 18.0 |

1. 2-Heptanone, NOP and Synergen SOC were charged to reaction vessel and heat up to 35° C.
2. At 35° C. Prothioconazole tech. was added and mixed until full dissolving was obtained.
3. At 35° C. TSP16, Crodafos TSA, Soprophor 3D33, Tween 20 and Witconol NS 500 LQ were added and mixed until the solution was clear.
4. The solution was cooled to 25° C.
5. The solution was filtered through 2.5 μm filter.

Example 9—Prothioconazole Formulation I

TABLE 9

| Component | % by weight |
|---|---|
| Prothioconazole Tech (as 100% a.i) | 23.26 |
| Soprophor 3D33 (2,4,6-tris(1-phenylethyl)polyoxyethylenated phosphates) | 16.28 |
| Synergen SOC (C10/C12 fatty alcohol-3-8 EO-3-8 PO & C16/C18 fatty alco-hol-5-10 EO-4-9 PO) | 4.19 |
| Agnique 420 (Alcohols, C16-18, ethoxylated propoxylated) | 9.77 |
| Agsolex 8 (N-octylpyrrolidone (NOP)) | 13.95 |
| Acetophenone | 32.56 |

1. Acetophenone, NOP, Agnique 420 and Synergen SOC were charged to reaction vessel and heat up to 35° C.
2. At 35° C. Prothioconazole tech. was added and mixed until full dissolving was obtained.
3. At 35° C. Soprophor 3D33 was added and mixed until the solution was clear.
4. The solution was cooled to 25° C.
5. The solution was filtered through 2.5 μm filter.

Example 10—Prothioconazole Formulation J

TABLE 10

| Component | % by weight |
|---|---|
| Prothioconazole Tech (as 100% a.i) | 23.15% |
| Soprophor ® TS/16 (Tristyrylphenol ethoxylate 16) | 16.20% |
| Synergen SOC (C10/C12 fatty alcohol-3-8 EO-3-8 PO & C16/C18 fatty alcohol-5-10 EO-4-9 PO) | 4.17% |
| Agnique 420 (Alcohols, Cl 6-18, ethoxylated propoxylated) | 9.72% |
| Agsolex 8 (N-octylpyrrolidone (NOP)) | 13.89% |
| Acetophenone | 32.87% |

1. Acetophenone, NOP, Agnique 420 and Synergen SOC were charged to reaction vessel and heat up to 35° C.
2. At 35° C. Prothioconazole tech. was added and mixed until full dissolving was obtained.
3. At 35° C. Soprophor TS/16 was added and mixed until the solution was clear.
4. The solution was cooled to 25° C.
5. The solution was filtered through 2.5 μm filter.

Example 11—Efficacy of Prothioconazole Formulations on Zymoseptoria *Tritici* (Protocol 1)

Formulations A and B were prepared in a volume of water corresponding to 200 L/ha.

Winter wheat plants cv. Alixan (Limagrain) at the BBCH 12 growth stage were treated with a hand sprayer at 2 bars calibrated to deliver the equivalent of 200 L/ha. Three replicates (pots) of 6 wheat plants each were used for all conditions tested.

After treatment, wheat plants were left to dry at room temperature and then placed in a climatic chamber: Temperature of 24° C. day/18° C. night—Photoperiod of 16 h light/8 h dark and a Relative Humidity of 65%.

Twenty-four hours after treatments, 5-cm fragments of the first leaf were cut and transferred in Petri dish containing water agar (6 leaf fragments per Petri dish). Leaf fragments were inoculated with a calibrated pycnospore suspension of Zymoseptoria *tritici* strain Mg Tri-R6 (isolated from French untreated wheat leaf in 2008. Moderately Resistant to DMI fungicides and Highly Resistant to QoI fungicides).

After inoculation, Petri dishes were placed in a climatic chamber: Temperature of 20° C. day/17° C. night—Photoperiod of 16 h light/8 h dark and adapted Relative Humidity Disease assessments are carried out 21 and 28 days post inoculation (dpi) by measuring the length of the necrosis and the total length of the leaf fragment. The intensity of infection is then determined in percent of the total length of the leaf fragment. The values of the intensity of infection obtained are compared by means of the Newman and Keuls test (XL-Stat software, Addinsoft Ltd.).

The Area Under the Disease Progress Curve (AUDPC) is a quantitative measure of disease intensity over time. The most commonly used method for estimating the AUDPC, the trapezoidal method, is performed by multiplying the average disease intensity between each pair of adjacent time points by the time interval corresponding and this for each interval time. The AUDPC is determined with the following formula by adding all of the trapezoids:

$$A_k = \sum_{i=1}^{N_i-1} \frac{(y_i + y_{i+1})}{2}(t_{i+1} - t_i)$$

yi=disease severity at the ith observation
ti=time (days) at the ith observation
N=total number of observations The fungicide efficacies was determined from the intensity of infection and the AUDPC values and expressed in percent of the untreated control.

TABLE 11

| # | Treatment | Application rate g AI/Ha | % Control 21 DAA | 28 DAA |
|---|---|---|---|---|
| 1 | Formulation A | 50 | 89.6 | 79.9 |
| 2 | Formulation B | 50 | 57.4 | 57.3 |
| 3 | Formulation C | 50 | 73.4 | 61.3 |
| 4 | Formulation D | 50 | 43.2 | 43.1 |

Conclusions—

The results in table 11 clearly show that formulations comprising both carbonyl containing solvent and N-alkyl pyrrolidone (formulations A and B; see tables 1 and 2) are much more potent and effective against the fungi than those that are lacking N-alkyl pyrrolidone (formulations C and D; see tables 3 and 4). (Please see formulation A Vs. C and formulation B Vs. D).

It is also evident from the results in table 11 that the compositions which include compounds of formula (II), in this case castor oil ethoxylate with carbon chain length of C16-C18 (formulations A and C; see tables 1 and 3) are much more potent and effective against the fungi than the compositions which include compounds such as Genapole X-80 with carbon chain length of C13 (formulations B and D; see tables 2 and 4). (Please see formulation A Vs. B and formulation C Vs. D).

Example 12—Efficacy of Prothioconazole Formulations on Zymoseptoria *Tritici* (Protocol 2)

Winter wheat plants cv. Alixan (Limagrain) at the BBCH 12 growth stage were treated with a hand sprayer at 2 bars calibrated to deliver the equivalent of 200 L/ha. Three replicates (pots) of 6 wheat plants each were used for all conditions tested.

After treatment, wheat plants were left to dry at room temperature for 1 hour and then placed in a climatic chamber: Temperature of 24° C. day/18° C. night—Photoperiod of 16 h light/8 h dark and a Relative Humidity of 65%.

Twenty-four hours after treatments, 5-cm fragments of the first leaf were cut and transferred on 90-mm diameter Petri dish containing water agar supplemented with an anti-senescing compound (6 leaf fragments per Petri dish). Leaf fragments were then inoculated with a paint brush deeped into the calibrated pycnospores suspension of *M. graminicola* strain Mg Tri-R6 (isolated from French untreated wheat leaves in 2008. Moderately Resistant to DMI fungicides and Highly Resistant to QoI fungicides).

After inoculation, Petri dishes were placed in a climatic chamber: Temperature of 20° C. day/17° C. night—Photoperiod of 16 h light/8 h dark and a Relative Humidity of 100% for 5 days and then of 85%.

Disease assessments are carried out 21 days post inoculation (dpi) by measuring the length of the necrosis and the total length of the leaf fragment. The intensity of infection is then determined in percent of the total length of the leaf fragment. The values of the intensity of infection obtained are compared by means of the Newman and Keuls test (XL-Stat software, Addinsoft Ltd.).

The Area Under the Disease Progress Curve (AUDPC) is a quantitative measure of disease intensity over time. The most commonly used method for estimating the AUDPC, the trapezoidal method, is performed by multiplying the average disease intensity between each pair of adjacent time points by the time interval corresponding and this for each interval time. The AUDPC is determined with the following formula by adding all of the trapezoids:

$$A_k = \sum_{i=1}^{N_i-1} \frac{(y_i + y_{i+1})}{2}(t_{i+1} - t_i)$$

yi=disease severity at the ith observation
ti=time (days) at the ith observation
N=total number of observations The fungicide efficacies were determined from the intensity of infection and the AUDPC values and expressed in percent of the untreated control.

TABLE 12

| # | Treatment | Application rate g AI/Ha | % Control 21 DAA |
|---|---|---|---|
| 1 | Formulation E | 50 | 90.9 |
| 2 | Formulation F | 50 | 95.3 |
| 3 | Formulation G | 50 | 91.8 |
| 4 | Formulation H | 50 | 88.0 |
| 5 | JOAO (Bayer) without NOP | 50 | 85.9 |

Conclusions—

JOAO® is a emulsifiable concentrate formulation sold by Bayer (active ingredient: prothioconazole at a concentration of 250 g/1) which is lacking NOP.

The results in table 12 clearly show that the formulations of the present invention (formulations E-H, see tables 5-8) are much more potent and effective against the fungi than commercial formulations that exist in the market.

Examples 13-19—Field Trails for Efficacy Evaluation of the Formulations of the Invention Several field trials were conducted on diverse crops infected with different diseases.

Proline® is an emulsifiable concentrate formulation sold by Bayer (active ingredient: prothioconazole at a concentration of 250 g/l) which is lacking NOP.

PESSEV=pest severity

PPM=parts per million

Difference=% eff of formulation I−% eff of Proline®.

Example 13—Biological Efficacy on *Puccinia* Recondite in Wheat

The trials were conducted as outdoor field trials in a complete randomized block design with 4 replicates and a plot size of 10 to 30 square meters in naturally occurring disease infections.

One or two applications were done at BBCH from 30 to 69. For that, the formulation was diluted in water (200 gr/ha of prothioconazole in 200-400 L/ha of water) and then applied with a boom sprayer with pressurized air on the plots.

The flag leaf or the leaf below the flag leaf were assessed at 15 to 29 days after last application. In the assessments the pest severity was assessed.

TABLE 13

| PUCCRE (Puccinia recondita) | | | | | |
|---|---|---|---|---|---|
| Wheat | Flag leaf (=leaf 1) 15 DAB | Flag leaf (=leaf 1) 24 DAA | Flag leaf (=leaf 1) 29 DAA | Flag leaf (=leaf 1) 27 DAB | Mean = 4 |
| Untreated (% disease PESSEV) | 34.0 | 58.8 | 31.2 | 53.2 | 44.3 |
| Formulation 1 (% eff) | 75.7 | 98.1 | 87.2 | 83.8 | 86.2 |
| Proline ® (% eff) | 46.3 | 93.2 | 82.9 | 71.9 | 73.6 |
| difference | 29.4 | 4.9 | 4.4 | 11.9 | 12.6 |

The results in table 13 clearly show that formulation I brings an added value in terms of efficacy towards *Puccinia* recondite in wheat compared to Proline®.

Example 14—Biological Efficacy on *Septoria tritici* in Wheat

The trials were conducted as outdoor field trials in a complete randomized block design with 4 replicates and a plot size of 10 to 30 square meters in naturally occurring disease infections.

One or two applications were done at BBCH from 30 to 69. For that, the formulation was diluted in water (200 gr/ha of prothioconazole in 200-400 L/ha of water) and then applied with a boom sprayer with pressurized air on the plots.

The flag leaf or the leaf below the flag leaf were assessed at 15 to 41 days after last application. In the assessments the pest severity was assessed.

TABLE 14

| SEPTTR (*Septoria tritici*) | | | | | |
|---|---|---|---|---|---|
| Wheat | Flag leaf (=leaf 1) 15 DAB | Flag leaf (=leaf 1) 29 DAB | Leaf 2 27 DAB | Leaf 2 41 DAB | Mean = 4 |
| Untreated (% disease PESSEV) | 28.0 | 15.6 | 18.0 | 53.8 | 28.9 |
| Formulation I (% eff) | 83.7 | 88.8 | 88.9 | 86.6 | 87.0 |
| Proline ® (% eff) | 66.4 | 80.4 | 75.6 | 50.6 | 68.2 |

TABLE 14-continued

| SEPTTR (*Septoria tritici*) | | | | | |
|---|---|---|---|---|---|
| Wheat | Flag leaf (=leaf 1) 15 DAB | Flag leaf (=leaf 1) 29 DAB | Leaf 2 27 DAB | Leaf 2 41 DAB | Mean = 4 |
| difference | 17.3 | 8.4 | 13.3 | 36.0 | 18.8 |

The results in table 14 clearly show that formulation I brings an added value in terms of efficacy towards *Septoria tritici* in wheat compared to Proline®.

Example 15—Biological Efficacy on *Fusarium culmorum* in Wheat

The trials were conducted as outdoor field trials in a complete randomized block design with 4 replicates and a plot size of 20 to 22.5 square meters. One trial was done in naturally occurring disease infection another trial was artificially inoculated.

One application was done at BBCH from 61 to 65. For that, the formulation was diluted in water (200 gr/ha of prothioconazole in 200-300 L/ha of water) and then applied with a boom sprayer with pressurized air on the plots.

The ears were assessed at 21 to 35 days after last application. In the assessments the pest severity was assessed. Additionally, the DON content was determined after yield (44-100 days after application).

TABLE 15

| FUSACU (*Fusarium culmorum*) | | | |
|---|---|---|---|
| Wheat | Ear 21 DAA | Ear 35 DAA | Mean = 2 |
| Untreated (% disease PESSEV) | 25.8 | 100 | 62.9 |
| Formulation 1 (% eff) | 70.4 | 60.8 | 65.6 |
| Proline ® (% eff) | 63.2 | 54.3 | 58.8 |
| difference | 7.2 | 6.5 | 6.8 |

The results in table 15 clearly show that formulation I brings an added value in terms of efficacy towards *Fusarium culmorum* in wheat compared to Proline®.

TABLE 16

| FUSACU (*Fusarium culmorum*) | | | |
|---|---|---|---|
| Wheat | Grain/DON 44 DAA | Grain/DON 100 DAA | Mean = 2 |
| Untreated (DON ppm) | 8,628 | 53,800 | 31,213 |
| Formulation 1 (eff) | 50 | 83.1 | 66.6 |
| Proline ® (% eff) | 36 | 74.3 | 55.2 |
| difference | 14 | 8.8 | 11.4 |

The results in table 16 clearly show that formulation I brings an added value in terms of reduction of DON in wheat infected with *Fusarium culmorum* compared to Proline®.

Example 16—Biological Efficacy on *Puccinia recondita* in Triticale

The trials were conducted as outdoor field trials in a complete randomized block design with 4 replicates and a plot size of 19.25 to 21 square meters in naturally occurring disease infections.

One or two applications were done at BBCH from 35 to 61. For that, the formulation was diluted in water (200 gr/ha of prothioconazole in 200 L/ha of water) and then applied with a boom sprayer with pressurized air on the plots.

The flag leaf was assessed at 26 to 28 days after last application. In the assessments the pest severity was assessed.

TABLE 17

PUCCRE (*Puccinia recondita*)

| Triticale | Flag leaf (=leaf 1) 28 DAB | Flag leaf (=leaf 1) 26 DAB | Mean = 2 |
|---|---|---|---|
| Untreated (% disease PESSEV) | 10.3 | 42.8 | 26.5 |
| Formulation 1 (% eff) | 83.1 | 82.6 | 82.8 |
| Proline ® (% eff) | 60.8 | 71.7 | 66.3 |
| difference | 22.2 | 10.9 | 16.6 |

The results in table 17 clearly show that formulation I brings an added value in terms of efficacy towards *Puccinia recondita* in triticale compared to Proline®.

Example 17—Biological Efficacy on *Septoria tritici* in Triticale

The trials were conducted as outdoor field trials in a complete randomized block design with 4 replicates and a plot size of 19.25 square meters in naturally occurring disease infections.

Two applications were done at BBCH from 37 to 55. For that, the formulation was diluted in water (200 gr/ha of prothioconazole in 200 L/ha of water) and then applied with a boom sprayer with pressurized air on the plots.

The flag leaf was assessed at 27 days after last application. In the assessments the pest severity was assessed.

TABLE 18

SEPTTR (*Septoria tritici*)

| Triticale | Flag leaf (=leaf 1) 27 DAB |
|---|---|
| Untreated (% disease PESSEV) | 30.3 |
| Formulation 1 (% eff) | 92.9 |
| Proline ® (% eff) | 90.1 |
| difference | 2.8 |

The results in table 18 clearly show that formulation I brings an added value in terms of efficacy towards *Septoria trifici* triticale compared to Proline®.

Example 18—Biological Efficacy on *Pyrenophora teres* in Barley

The trial was conducted as outdoor field trials in a complete randomized block design with 4 replicates and a plot size of 30 square meters in naturally occurring disease infections.

One application was done at BBCH from 51. For that, the formulation was diluted in water (200 gr/ha of prothioconazole in 300 L/ha of water) and then applied with a boom sprayer with pressurized air on the plots.

The leaf below the flag leaf was assessed at 15 days after last application. In the assessments the pest severity was assessed.

TABLE 19

PYRNTE (*Pyrenophora teres*)

| Barley | Leaf 2 15 DAB |
|---|---|
| Untreated (% disease PESSEV) | 15.9 |
| Formulation 1 (% eff) | 71.8 |
| Proline ® (% eff) | 60.4 |
| difference | 11.4 |

The results in table 19 clearly show that formulation I brings an added value in terms of efficacy towards *Pyrenophora teres* in barley compared to Proline®.

Example 19—Biological Efficacy on *Rhynchosporium secalis* in Rye

The trial was conducted as outdoor field trials in a complete randomized block design with 4 replicates and a plot size of 20 square meters in naturally occurring disease infections.

One application was done at BBCH 65. For that, the formulation was diluted in water (200 gr/ha of prothioconazole in 200 L/ha of water) and then applied with a boom sprayer with pressurized air on the plots.

The leaf below the flag leaf was assessed 49 days after last application. In the assessments the pest severity was assessed.

TABLE 20

RHYNSE (*Rhynchosporium secalis*)

| Rye | Leaf 2 49 DAA |
|---|---|
| Untreated (% disease PESSEV) | 24.3 |
| Formulation 1 (% eff) | 69.1 |
| Proline ® (% eff) | 58.8 |
| difference | 10.3 |

The results in table 20 clearly show that formulation I brings an added value in terms of efficacy towards *Rhynchosporium secalis* in barley compared to Proline®.

Example 20—Efficacy of Prothioconazole Formulations on Zymoseptoria *Tritici*

The two formulations were tested at rate of 25 g a.i./ha corresponding to 125 mg a.i./L or ppm. The fungicides were prepared one hour before treatment in a volume of water corresponding to 200 l/ha.

The fungicides were pulverized by the aim of a hand sprayer on wheat plants cv. ALIXAN at BBCH 12. Control plants were treated with distilled water. Three replicates (pots) of 6 wheat plants each were used for each condition tested.

After treatment, wheat plants were left to dry at room temperature for 1 hour and then placed in a climatic chamber: Temperature of 24° C. day/18° C. night—Photoperiod of 16 h light/8 h dark and a Relative Humidity of 65%.

Twenty-four hours after treatments, wheat leaf fragments of the first leaf were cut and transferred in Petri dish containing adapted water agar (6 leaf fragments per Petri dish). Leaf fragments were inoculated with a calibrated pycnospores suspension of *Z. tritici* strain Mg Tri-R6.

After inoculation, Petri dishes were placed in a climatic chamber: Temperature of 20° C. day/17° C. night Photoperiod of 16 h light/8 h dark and controlled Relative Humidity.

Disease assessments were carried out 28 days post inoculation (dpi) by measuring the length of the necrosis of the leaf fragment. The intensity of infection was then determined in percent of the total length of the leaf fragment.

The Area Under the Disease Progress Curve (AUDPC) is a quantitative measure of disease intensity over time. The most commonly used method for estimating the AUDPC, the trapezoidal method, is performed by multiplying the average disease intensity between each pair of adjacent time points by the time interval corresponding and this for each interval time. The AUDPC was determined with the following formula by adding all of the trapezoids:

$$A_k = \sum_{i=1}^{N_i-1} \frac{(y_i + y_{i+1})}{2}(t_{i+1} - t_i)$$

yi=disease severity at the ith observation ti=time (days) at the ith observation N=total number of observations The fungicide efficacies of formulation J and Proline 275 EC by Bayer were determined from the AUDPC values and expressed in percent of the untreated control.

TABLE 21

| Treatment | Application rate g AI/Ha | % Control after 28 days |
|---|---|---|
| Formulation J | 25 | 86.7% |
| Proline 275 EC | 25 | 81.3% |

Conclusions—

Proline® 275 EC is an emulsifiable concentrate formulation sold by Bayer (active ingredient: prothioconazole at a concentration of 275 g/l) which is lacking NOP.

The results in table 21 clearly show that the formulation of the present invention (formulation J, see table 10) is much more potent and effective against the fungi than commercial formulation that exist in the market.

Example 21—Leaf Migration Test

Leaf migration test: treatment selectively applied only on the central section of the leaf.

Inoculation: 2.5*10^6 CFU/ml inoculum suspension, sprayed using the atomizer.

Petri dish maintenance: lab bench, 23-17Co, ambient RH, constant LED light.

Figure 2:
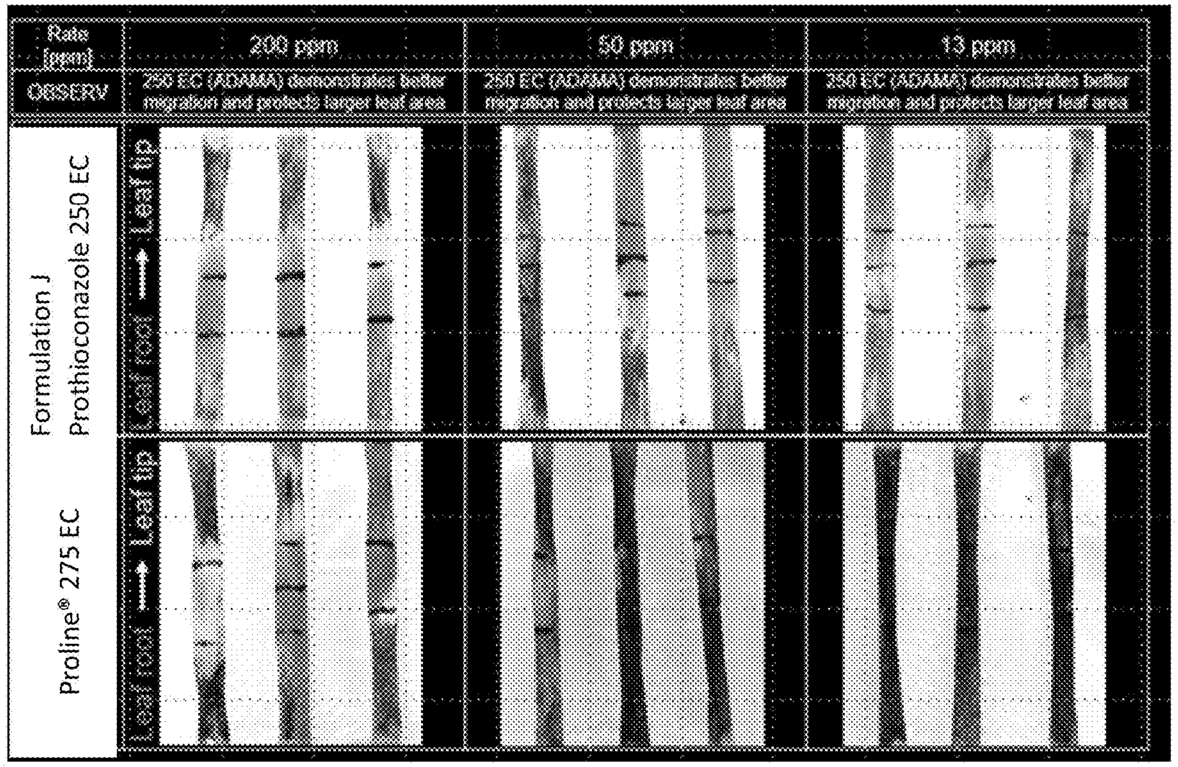
FIG. 2 shows leaf migration of formulation J Vs. Proline 275 EC.

Phenotyping: visual evaluation and imaging at DAS_16. The results are shown in FIGS. 1 and 2.

Figure 3:
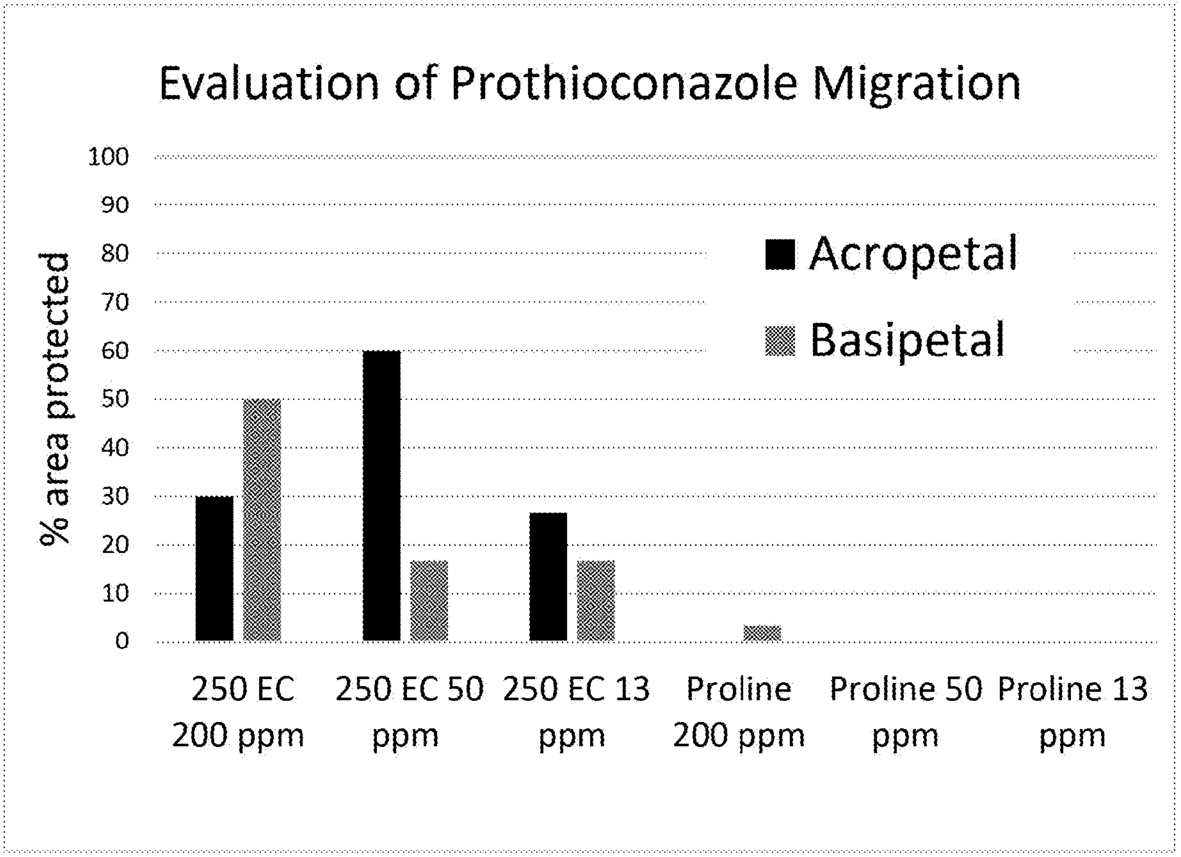
FIG. 3 shows the acropetal and basipetal migration of prothioconazole.

Evaluation Methodology:

Relative area free of *Septoria* pycnidia was evaluated on each individual leaf above (acropetal) and below (basipetal) the treated area. The results are shown in Table 22 and FIG. 3.

TABLE 22

Results of the leaf migration test

| Treatment | Acropetal protection % area protected | | | | Basipetal protection % area protected | | | |
|---|---|---|---|---|---|---|---|---|
| | Leaf 1 | Leaf 2 | Leaf 3 | Average | Leaf 1 | Leaf 2 | Leaf 3 | Average |
| Formulation J (250 EC) 200 ppm | 30 | 30 | 30 | 30 | 50 | 50 | 50 | 50 |
| Formulation J (250 EC) 50 ppm | 0 | 80 | 100 | 60 | 0 | 20 | 30 | 17 |
| Formulation J (250 EC) 13 ppm | 70 | 10 | 0 | 27 | 0 | 50 | 0 | 17 |
| Proline 200 ppm | 0 | 0 | 0 | 0 | 0 | 10 | 0 | 3 |
| Proline 50 ppm | 0 | 0 | 0 | 0 | 0 | 0 | 0 | 0 |
| Proline 13 ppm | 0 | 0 | 0 | 0 | 0 | 0 | 0 | 0 |

Conclusions—

Formulation J (250 EC) demonstrated a better migration ability, affecting larger area adjacent to the treated segment both acropetally and basipetally.

The invention claimed is:

1. An agrochemical composition comprising:

a) prothioconazole;

b) a carbonyl containing solvent selected from the group consisting of acetophenone, N,N-dimethyldecanamide, N,N-dimethyldecenamide, N,N-dimethyloctanamide, and a mixture thereof; and c) N-alkyl pyrrolidone of formula (I):

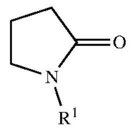

wherein R1 is a straight, saturated hydrocarbon group having 8 carbon atoms, and wherein:

(i) the composition is an emulsion concentrate (EC) composition, (ii) the amount of the prothioconazole in the composition is about 20% to about 30% by weight based on the total weight of the composition, (iii) the amount of the carbonyl containing solvent is about 20% to about 33% by weight based on the total weight of the composition, (iv) the amount of the N-alkyl pyrrolidone of formula (I) is about 14% to about 22% by weight based on the total weight of the composition, (v) the weight ratio between the carbonyl containing solvent and the N-alkyl pyrrolidone of formula (I) is of 1:1 to 3:1, and (vi) the combination of the N-alkyl pyrrolidone of formula (I) with a carbonyl containing solvent is effective for increasing the efficacy of the prothioconazole.

2. The agrochemical composition of claim 1, wherein the composition comprises an effective amount of compound of formula (II):

R2-Z-(CmH2mO)x-(CnH2nO)y-H wherein R2 is linear or branched, saturated or unsaturated alkyl radical having from 14 to 20 carbon atoms; or R2 is linear or branched, saturated or unsaturated acyl radical having from 14 to 20 carbon atoms, Z is selected from oxygen or nitrogen atom, m is an integer equal to 2, n is an integer equal to 3, x is an integer of from 3 to 50 and y is an integer of from 0 to 50.

3. The composition of claim 1, wherein the carbonyl containing solvent is acetophenone.

4. The composition of claim 1, wherein:

a. the carbonyl containing solvent is N, N-dimethyldecanamide, N, N-dimethyldec-9-en-1-amide, or acetophenone, b. the amount of prothioconazole in the composition is about 25% by weight based on the total weight of the composition, and c. the weight ratio weight ratio between the carbonyl containing solvent and the N-alkyl pyrrolidone of formula (I) is between 1:1 to 2:1.

5. The composition of claim 1, wherein the amount of prothioconazole in the composition is of about 25% by weight based on the total weight of the composition.

6. The composition of claim 1, wherein the weight ratio between the carbonyl containing solvent and the N-alkyl pyrrolidone of formula (I) is between 1:1 to 2:1.

7. The composition of claim 1, wherein the carbonyl containing solvent is dimethyldecanamide or acetophenone.

8. A method for controlling and/or preventing pests comprising applying an effective amount of the composition of claim 1 to a locus where the pest is to be controlled and/or prevented so as to thereby control and/or prevent the pest.

9. The method of claim 8, wherein:

a. the locus is a crop field;

b. the pest is phytopathogenic harmful fungi selected from the group consisting of *Septoria* species, *Fusarium* species, *Puccinia* species, *Erysiphe* species, *Drechslera* species, *Ramularia* species, *Mycosphaerella* species and *Rhynchosporium* species;

c. the composition is applied in an amount from about 0.1 L/ha to about 2 L/ha; and/or d. the composition is applied in an amount from about 20 g/ha of prothioconazole to about 500 g/ha of prothioconazole.

10. A method for controlling and/or preventing pests comprising applying an effective amount of the composition of claim 2 to a locus where the pest is to be controlled and/or prevented so as to thereby control and/or prevent the pest.

11. The method of claim 10, wherein:

a. the locus is a crop field;

b. the pest is phytopathogenic harmful fungi selected from the group consisting of *Septoria* species, *Fusarium* species, *Puccinia* species, *Erysiphe* species, *Drechslera* species, *Ramularia* species, *Mycosphaerella* species and *Rhynchosporium* species;

c. the composition is applied in an amount from 0.1 L/ha to about 2 L/ha; and/or d. the composition is applied in an amount from about 20 g/ha of prothioconazole to about 500 g/ha of prothioconazole.

12. A method for reducing deoxynivalenol (DON) mycotoxin in a field of crop comprising applying an effective amount of the composition of claim 2 to a crop infected by fungi of the *Fusarium* species.

13. The method of claim 12, wherein the crop is selected from the group consisting of wheat, rye, rice, barley, oats, sorghum/millet, triticale, maize, rapeseed, beans, peanuts and sunflowers; and/or the *Fusarium* species is *Fusarium culmorum*.

14. A method for reducing deoxynivalenol (DON) mycotoxin in a field of crop comprising applying an effective amount of the composition of claim 1 to a crop infected by fungi of the *Fusarium* species.

* * * * *